(12) United States Patent
Faraone et al.

(10) Patent No.: US 8,003,427 B2
(45) Date of Patent: Aug. 23, 2011

(54) TUNABLE CAVITY RESONATOR AND METHOD FOR FABRICATING SAME

(75) Inventors: Lorenzo Faraone, Western Australia (AU); John Marcel Dell, Western Australia (AU); Charles Anthony Musca, Western Australia (AU); Jarek Antoszewski, Western Australia (AU); Kevin James Winchester, Western Australia (AU)

(73) Assignee: The University of Western Australia, Nedlands (AU)

( * ) Notice: Subject to any disclaimer, the term of this patent is extended or adjusted under 35 U.S.C. 154(b) by 0 days.

(21) Appl. No.: 12/153,412

(22) Filed: May 19, 2008

(65) Prior Publication Data
US 2009/0303570 A1    Dec. 10, 2009

Related U.S. Application Data

(62) Division of application No. 10/507,015, filed as application No. PCT/AU03/00280 on Mar. 10, 2003.

(30) Foreign Application Priority Data

Mar. 8, 2002    (AU) ........................... PS0980

(51) Int. Cl.
*H01L 21/00* (2006.01)

(52) U.S. Cl. ............. 438/69; 250/338.1; 372/20

(58) Field of Classification Search .......... 372/20, 372/45; 356/352
See application file for complete search history.

(56) References Cited

U.S. PATENT DOCUMENTS

| | | | |
|---|---|---|---|
| 5,550,373 A | 8/1996 | Cole et al. | |
| 6,277,696 B1 * | 8/2001 | Carey et al. | 438/289 |
| 6,311,004 B1 * | 10/2001 | Kenney et al. | 385/130 |
| 6,438,149 B1 * | 8/2002 | Tayebati et al. | 372/45.01 |
| 6,567,209 B2 | 5/2003 | Lipson et al. | |
| 6,665,459 B2 * | 12/2003 | Cush et al. | 385/15 |
| 2002/0031155 A1 * | 3/2002 | Tayebati et al. | 372/50 |
| 2002/0131458 A1 | 9/2002 | Sirbu et al. | |
| 2005/0226281 A1 | 10/2005 | Faraone et al. | |

FOREIGN PATENT DOCUMENTS

| | | |
|---|---|---|
| EP | 1146377 A | 10/2001 |
| EP | 1146378 A | 10/2001 |
| WO | 99/34484 A | 7/1999 |
| WO | 01/09995 A | 2/2001 |

OTHER PUBLICATIONS

Winchester et al. "tunabel Fabry-Perot Cavities Fabricated from PEVCD Silicon Nitride Employing Zinc Sulfide as the Sacrificial Layer." J. Micromech. Microeng. 11 (2001): p. 589-594.*
International Search Report for PCT/AU03/00280, May 15, 2003.
Larson, M.C. and J.S. Harris, Jr., Broad Tunable Resonant-Cavity Light Emission, Appl. Phys. Lett 67 (5), Jul. 31, 1995.

* cited by examiner

*Primary Examiner* — David P Porta
*Assistant Examiner* — Casey Bryant
(74) *Attorney, Agent, or Firm* — Nixon & Vanderhye, PC

(57) ABSTRACT

An example tunable cavity resonator for filtering radiation in the optical and IR wavelengths and an example method for fabricating same. The example resonator includes a pair of reflectors, one in fixed relationship to a substrate and the other formed upon a suspended moveable membrane disposed a cavity length from the one reflector. The resonator also includes a pair of spaced apart electrodes either constituted by the reflectors or juxtaposed therewith, which are electrostatically operable to move the membrane and other reflector relative to the one reflector.

48 Claims, 14 Drawing Sheets

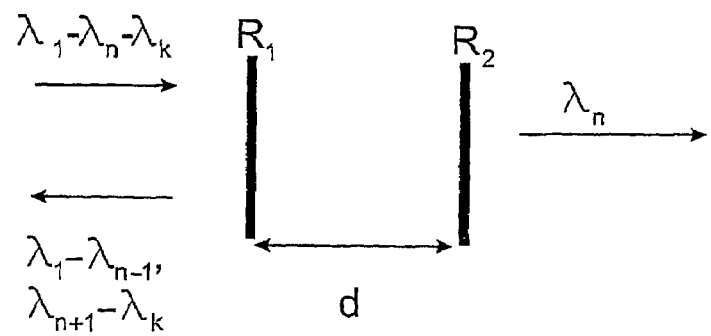
Fig. 1a.
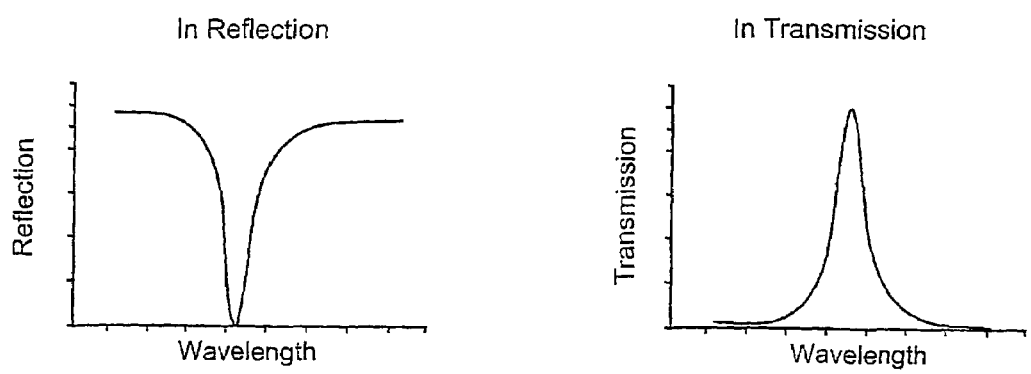
In Reflection
Fig. 1b.
In Transmission
Fig. 1c.

- Substrate
- Zinc Sulfide
- AZ Photoresist
- Gold
- PECVD Silicon Nitride

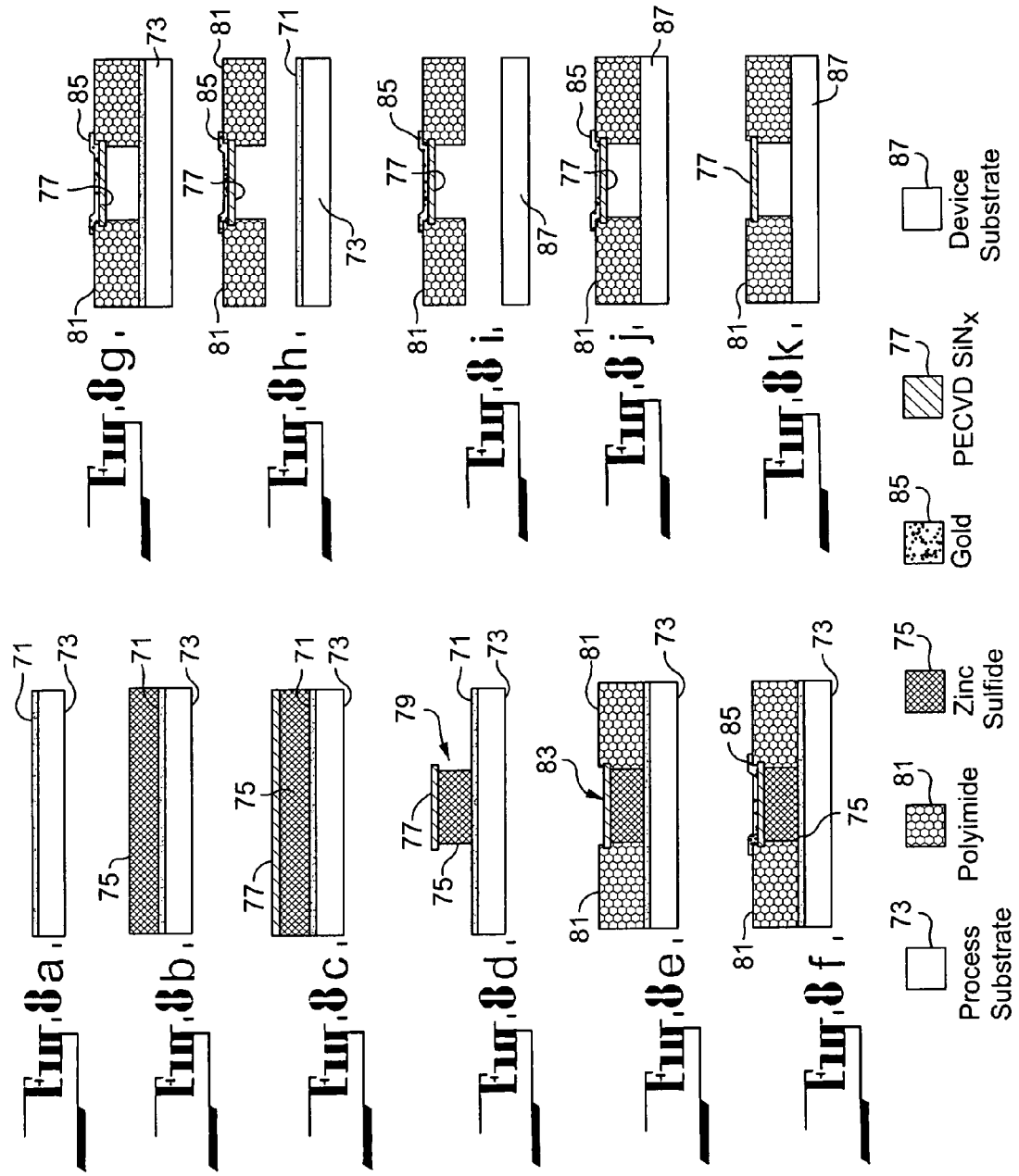

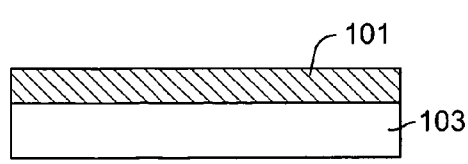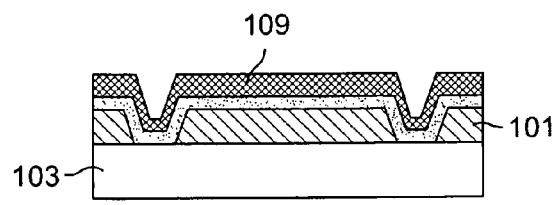
Fig. 14a.    Fig. 14e.
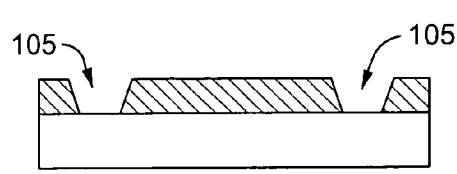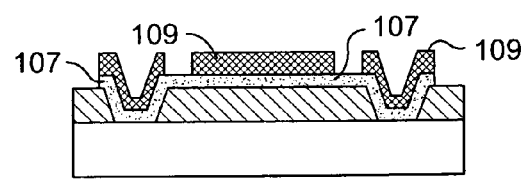
Fig. 14b.    Fig. 14f.
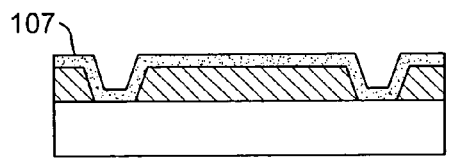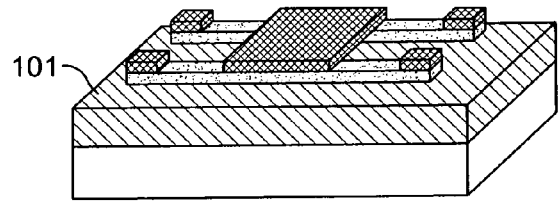
Fig. 14c.    Fig. 14g.
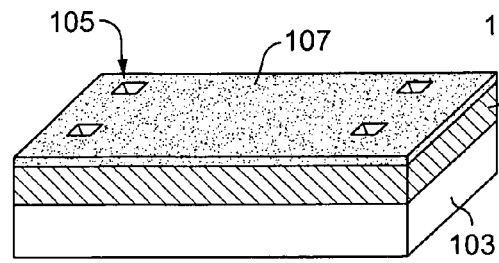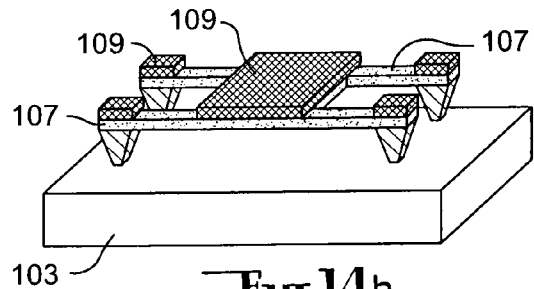
Fig. 14d.    Fig. 14h.

TUNABLE CAVITY RESONATOR AND METHOD FOR FABRICATING SAME

CROSS-REFERENCE TO RELATED APPLICATIONS

This application is a divisional of application Ser. No. 10/507,015, filed Apr. 11, 2005, which is the U.S. national phase of international application no. PCT/AU03/00280, filed Mar. 10, 2003, which designated the U.S. and claims priority to AU application no. PS 0980 filed Mar. 8, 2002. The contents of these applications are incorporated herein in their entirety.

BACKGROUND AND SUMMARY

This invention relates to tunable cavity resonators utilising micro electromechanical systems (MEMS) structures in the form of deformable suspended membranes suitable for, but not limited to, photonic purposes involving infrared (IR) electromagnetic radiation, and a method for fabricating the same.

The invention has particular, although not exclusive, utility in the fabrication of semiconductor devices that can be used as tunable detectors, emitters and filters for wavelength division multiplexing (WDM), micro-spectrometry and other purposes.

Aspects of the invention may be employed as multi or hyperspectral systems, wavelength agile detector systems and detector systems that are blind to countermeasures.

Throughout the specification, unless the context requires otherwise, the word "comprise" or variations such as "comprises" or "comprising", will be understood to imply the inclusion of a stated integer or group of integers but not the exclusion of any other integer or group of integers.

The following discussion of the background art is intended to facilitate an understanding of the present invention only. It should be appreciated that the discussion is not an acknowledgement or admission that any of the material referred to is or was part of the common general knowledge in art as at the priority date of the application.

MEMS represent the integration of mechanical elements, sensors, actuators, photonics and electronics on single substrates. The use of microfabrication technology employed in silicon very large scale integration (VLSI) integrated circuit technology to generate miniature three-dimensional structures such as motors, gears, accelerometers and pressure sensors on the same substrate as the associated drive and sensing electronics, has dramatically expanded the field of mechatronics. In addition to allowing mechanical manufacture on a micro-miniature scale, MEMS technology brings the low-cost, high throughput advantages of VLSI technology to mechanical and sensor systems.

The use of MEMS structures in the fabrication of tunable cavity resonators to form a deformable suspended membrane is known, albeit for filtering applications in a very restrictive subset of the optical spectrum of wavelengths. The fabrication of these resonator devices has generally involved constructing the MEMS structure on a silicon substrate using technologies such as bulk micromachining and surface machining. Further, the use of such resonator devices has generally been limited to applications in which the wavelength of resonance need only be tuned a small amount (in the order of 0.01 to 0.10 µm). This in turn has limited the application of such resonator technology to short wavelengths (less than 1.6 µm), i.e. in wavelength regions of near IR and below. In the context of IR filtering technology, these wavelengths are less than 2 µm, and thus these types of resonator devices are quite unsuitable for applications in the short wavelength infrared (SWIR), the mid-wavelength infrared (MWIR), the long wavelength infrared (LWIR) and visible wavelength regions.

The inventors of the present invention have discovered one of the reasons for this is that, generally, surface micromachining techniques rely on high temperature (>700° C.) deposition processes such as low-pressure chemical vapour deposition (LPCVD) to produce high quality membrane films such as silicon nitride. However, the resultant membranes tend to be formed with considerable tensile stress. This tensile stress results in structures that are mechanically very stiff, preventing the large displacement needed for IR Fabry-Perot (FP) resonator applications, particularly in the short-wavelength infrared (SWIR—1.6-2.5 µm), mid-wavelength infrared (MWIR—3-5 µm) and long-wavelength infrared (LWIR—8-12 µm) regions.

Hence, it has previously been understood in the art that the use of MEMS structures in the fabrication of tunable cavity resonators is only applicable to very small wavelength applications, limiting the scope of the technology to near IR radiation and below for tunable lasers and detectors for short wavelength (e.g. less than 1500 nm optical communications) applications, and is not really suitable for longer wavelength radiation applications in the IR wavelength regions.

Resonant semiconductor FP cavity devices that have been fabricated for shorter wavelength applications using high temperature deposition processes generally have a fixed reflector layer that acts as a reflector on the substrate and a supported flexible membrane also having a reflector layer that acts as another reflector, the flexible membrane and the substrate being separated by an air gap. Tunability is achieved by deflecting the membrane through the application of a force. This force can be applied by various means, such as by way of a voltage applied to piezoelectric microactuators affixed to the membrane, or by applying a voltage across a pair of electrodes, one being, or surmounted to, the fixed reflector and the other being, or surmounted to, the reflector on the flexible membrane.

One method of constructing these FP cavity microstructure devices requires the use of a sacrificial etch layer, which is used to temporarily support the membrane during the fabrication process. This layer is removed via an etching stage in the fabrication step to release the membrane. The membrane layer itself consists of a film, such as silicon nitride film, upon which reflector layers, such as Au/Cr or distributed Bragg reflectors, are later deposited to form a reflector.

$SiO_2$ is commonly employed as the sacrificial layer for LPCVD silicon nitride microstructure devices and is generally etched using HF or buffered HF (BHF), as both of these etchants demonstrate high selectivity when etching $SiO_2$ sacrificial layers from silicon nitride membranes formed using LPCVD.

A concomitant problem with using high temperature deposition processes is the controllability of the intrinsic stress in the membrane during the fabrication process, quite aside from the issue of the high tensile stress that may be provided in the membrane after fabrication is completed. Stress control in suspended membranes is important as the intrinsic stress in the membrane directly determines the sensitivity of the device to any applied force. Too much intrinsic tensile stress results in stiff membranes, which in extreme situations can cause membranes to fracture, whilst compressive stresses result in buckled and/or collapsed membranes.

Therefore, in any application of MEMS structure technology to longer wavelength filtering, stress control is a major problem that has to be overcome.

Control is also critical in the fabrication of multi-layered structures, such as distributed Bragg reflectors. In these multi-layered applications, any unaccounted for residual stress can easily result in stress mismatch between the layers, leading to bowing or buckling of the released membrane.

Furthermore, in optical applications where FP cavity devices require a reflecting surface, the uniformity and flatness of the layer are of critical importance. Thus stress control during the fabrication of the membrane is important to ensure the layer remains flat and uniform on release.

Most photonic systems require a material system that has a direct and easily modifiable bandgap. This allows efficient optical generation and detection, while control of the bandgap makes possible bandgap engineering for enhanced device performance and allows use of quantum mechanical effects for new devices, such as photoconductors, photodiodes, avalanche photodiodes, bolometers, and others.

In order to access a large range of optical wavelengths, a wide variety of Group III-V and Group II-VI semiconductor systems including AlGaN/GaN, AlGaAs/GaAs, InAlGaAsP/InP, InGaP/GaP, HgCdTe/CdTe and ZnTeSe/ZnTe have been developed. A common feature of these materials (with the exception of AlGaN/GaN) is the requirement to undertake processing at temperatures significantly lower than those offered by the LPCVD process. Due to the differences in material properties and process technology, different process approaches must be used for each of these materials, significantly adding to the problem of MEMS development for systems integrating photonic devices.

There are many applications in the optoelectronics area, including IR applications, requiring wavelength tunable detectors and/or emitters. Examples of these include: high bandwidth optical communication systems utilising WDM technology; infrared detectors such as photoconductors, photodiodes and avalanche photodiodes; and micro-spectrometry to name but a few. This wavelength tunability can be achieved through the use of an FP cavity device. However, a simple and versatile method for fabricating a tunable FP cavity device with a moveable membrane having requisite stress characteristics and quality that can be used in longer photonic wavelength applications with wavelengths extending from less than 1 micron to greater than 20 microns, and which can be fabricated at relatively low temperatures has tended to have eluded the art to date.

It is an object of the present invention to provide for the fabrication of a tunable cavity resonator having a moveable suspended membrane and which can be formed on a variety of semiconductor systems to access a range of optical wavelengths, including infrared.

It is a preferred object of the invention to provide for an improved method of fabricating a tunable resonant cavity with a moveable and suspended membrane at a low deposition temperature.

It is a further preferred object to provide for the fabrication of a tunable cavity resonator having a moveable suspended membrane that can operate with wavelengths in the infrared regions.

It is another preferred object of the invention to provide for controlling the stress in the membrane during the fabrication of a tunable cavity resonator to enable it to be formed on a variety of semiconductor systems.

In accordance with one aspect of the present invention, there is provided a method for fabricating a tunable cavity resonator having a pair of reflectors, one being disposed in fixed relationship to a substrate material and the other being a suspended moveable membrane disposed a cavity length from the one reflector, and a pair of electrodes either being constituted by the reflectors or being juxtaposed therewith, one electrode with the one reflector and the other electrode with the other reflector, the method comprising:

depositing a first reflector layer on a substrate to form the one reflector of the cavity resonator;

forming a sacrificial layer of a prescribed material having a high etch selectivity for releasing the membrane in a suspended and spaced relationship from the one reflector;

forming the membrane on the sacrificial layer using a deposition technique characterised by providing the required intrinsic stress in the membrane;

depositing a second reflector layer on the membrane to form the other reflector;

patterning the second reflector layer in accordance with a prescribed membrane geometry;

etching the second reflector layer and the membrane to achieve said prescribed membrane geometry; and etching the sacrificial layer to release the membrane and suspend it in substantially parallel relation to the first reflector layer.

Preferably, the method includes the step of forming recesses for the support locations in the sacrificial layer down to the substrate, after forming the sacrificial layer and prior to forming the membrane thereon;

extending the membrane layer to cover the sacrificial layer and the exposed substrate within the recesses during the forming of the membrane;

extending the second reflector layer to cover the membrane layer within the recesses during the forming of the second reflector layer; and etching the sacrificial layer to remove it from around the membrane, so that the membrane and reflector layers are disposed with the recesses are revealed to constitute the support structure for suspending the membrane and the second reflector above the substrate.

Preferably, the method includes initially etching the sacrificial layer to remove regions thereof down to said first reflector layer on the substrate exposed by said etching.

Preferably, the method includes protecting those regions of the sacrificial layer intended to function as the residual support structure of the membrane.

Preferably, the method includes finally etching the remaining unprotected regions of the sacrificial layer to release the membrane and suspend it by the support structure in substantially parallel relation to the first reflector layer.

Preferably, the substrate material is a semiconductor system that provides access to the optical wavelengths necessary for resonance purposes in the resonant cavity.

Preferably the cavity length corresponds to optical wavelengths in the infrared region.

Preferably, the displacement of the suspended moveable membrane is commensurate to the full cavity length, but is controlled to be marginally less than the full cavity length so that the cavity can accommodate such displacement without the membrane contacting the one reflector.

Preferably, the membrane is formed of silicon nitride.

Preferably, the sacrificial layer is formed of zinc sulphide.

Preferably, the substrate is formed from an infrared sensitive material.

Preferably, the substrate is formed of mercury cadmium telluride (MCT).

Preferably, the deposition technique for forming the membrane is PECVD.

Optionally, the electrodes are formed separately of the reflective layers.

Alternatively, the reflective layers are formed to function as electrodes.

Preferably, the second reflector layer is etched using an anisotropic etching process.

Preferably, the anisotropic etching process for the second reflector layer involves dry etching.

Preferably, the dry etching involves plasma etching.

Preferably, the plasma etching is reactive ion etching.

Preferably, the sacrificial layer is initially etched using an isotropic etching process.

Preferably, the isotropic etching process for initially etching the sacrificial layer involves dry etching.

Preferably, the protection of the support structures is provided by photoresist.

Preferably, the remaining unprotected regions of the sacrificial layer are finally etched using an isotropic etching process.

Preferably, the isotropic etching process for finally etching the sacrificial layer involves wet etching.

In accordance with another aspect of the present invention, there is provided a tunable cavity resonator fabricated according to the method defined in the preceding aspect of the invention.

In accordance with a further aspect of the present invention, there is provided a tunable cavity resonator comprising:
a substrate material;
a moveable membrane disposed in substantially parallel relationship to said substrate and suspended relative thereto at the periphery of the membrane by a support structure;
a pair of reflectors, one being a first reflector layer disposed in fixed relationship upon the substrate material and the other being a second reflector layer disposed on the suspended deformable membrane to form a resonant cavity, the reflectors being disposed a cavity length from each other;
the membrane and one reflector being shaped in accordance with a prescribed membrane geometry; and
a pair of electrodes either being constituted by the reflectors or being juxtaposed therewith, one electrode with the one reflector and the other electrode with the other reflector;
wherein the suspended moveable membrane is of substantially uniform thickness and has an intrinsic stress to permit electrostatic displacement of the membrane over relatively large distances using relatively low voltages applied to the electrodes.

Preferably, the substrate material is a semiconductor system that provides access to the optical wavelengths necessary for resonance purposes in the resonant cavity.

Preferably the cavity length corresponds to optical wavelengths in the infrared region.

Preferably, the displacement of the suspended moveable membrane can be up to the full cavity length, which is correspondingly larger to accommodate such displacement without the membrane contacting the one reflector.

Preferably, the membrane is formed of silicon nitride.

Preferably, the support structures are formed of zinc sulphide.

Preferably, the substrate is formed from an infrared sensitive material.

Preferably, the substrate is formed of mercury cadmium telluride (MCT).

In one embodiment, it is preferred that the electrodes are formed separately of the reflective layers.

In another embodiment, it is preferred that the reflective layers are formed to function as electrodes.

In accordance with another aspect of the invention, there is provided a method for fabricating a tunable cavity resonator for filtering incident radiation with longer photonic wavelengths from applications where the wavelengths may be in the order of less than 1 micron to applications where the wavelengths may be greater than 20 microns, the cavity resonator having a pair of reflectors, one being disposed in fixed relationship to a substrate material and the other being a disposed on a moveable membrane suspended by a support structure and disposed a cavity length from the one reflector, to form a Fabry Perot (FP) cavity, and a pair of electrodes either being constituted by the reflectors or being juxtaposed therewith, one electrode with the one reflector and the other electrode with the other reflector, to control the movement of the membrane in response to a prescribed dc voltage applied across electrodes, the method comprising:
forming the membrane on a sacrificial layer using a plasma deposition technique at a sufficiently low temperature with a gas flow ratio and prescribed RF frequency and power to excite the plasma so that the resultant stress in the membrane when released from the sacrificial layer and suspended by the support structure is controllable and very low, and the pinhole density in the membrane is sufficiently low to provide the membrane with the requisite integrity and morphology to exhibit a near-ideal Fabry Perot response.

Preferably, the cavity resonator functions as a filter that is applicable for selecting incident radiation of wavelengths in ranges, whereby the wavelength of resonance can be in the region of 100 nm or 1,000,000 nm.

Preferably, the membrane is formed of silicon nitride.

Preferably, the sacrificial layer is formed of zinc sulphide.

Preferably, the substrate is formed from an infrared sensitive material.

Preferably, the substrate is formed of mercury cadmium telluride (MCT).

Preferably, the deposition technique for forming the membrane is PECVD.

Preferably, the temperature of the deposition is matched to the tolerance of the materials constituting the sacrificial layer and the substrate.

Preferably, the gas flow ratio is selected at the desired deposition temperature to achieve the requisite intrinsic stress at a prescribed RF frequency and power that still provides the membrane with the requisite integrity and morphology to maintain a high yield process.

Preferably, the gas flow ratio comprises an appropriate ratio of silane to ammonia to a diluting gas so as to achieve the required level of intrinsic stress that can result in a controlled low stress in the released membrane.

Optionally, the electrodes are formed separately of the reflective layers.

Alternatively, the reflective layers are formed to function as electrodes.

Preferably, the second reflector layer is etched using an anisotropic etching process.

Preferably, the anisotropic etching process for the second reflector layer involves dry etching.

Preferably, the dry etching involves plasma etching.

Preferably, the plasma etching is reactive ion etching.

Preferably, the sacrificial layer is initially etched using an isotropic etching process.

Preferably, the isotropic etching process for initially etching the sacrifical layer involves dry etching.

Preferably, the protection of the support structures is provided by photoresist.

Preferably, the remaining unprotected regions of the sacrificial layer are finally etched using an isotropic etching process.

Preferably, the isotropic etching process for finally etching the sacrificial layer involves wet etching.

BRIEF DESCRIPTION OF THE DRAWINGS

Carrying out the invention will be better understood in the light of the following description of the best mode. The description is made with reference to the accompanying drawings, wherein:

FIG. 1A is a schematic diagram illustrating the principle of operation of an FP cavity;

FIG. 1B is a graph showing the typical optical response in reflection;

FIG. 1C is a graph showing the typical optical response in transmission;

FIGS. 8A to 8K are schematic side elevations showing the sequence of steps involved in fabricating a MEMS structure in the form of an FP cavity that is transferred from one substrate to another in accordance with the second embodiment;

FIGS. 14A to 14H are schematic side and isometric elevations showing the sequence of steps involved in fabricating a MEMS structure in the form of an FP cavity directly upon a substrate in accordance with the sixth embodiment.

DETAILED DESCRIPTION OF EXAMPLE EMBODIMENTS

The principle of operation of a Fabry-Perot cavity is shown in FIG. 1A, whereby an FP cavity is formed between two reflecting plates $R_1$ and $R_2$ that are spaced apart a cavity length d. The cavity acts as a resonator to electromagnetic energy, whereby the cavity length is related to the resonant frequency of the cavity. Thus wavelengths $\lambda_n$ of incident electromagnetic energy at wavelengths $\lambda_1$-$\lambda_n$-$\lambda_k$ directed at the cavity are transmitted through the cavity and the remaining wavelengths $\lambda_1$-$\lambda_{n-1}$, $\lambda_{n+1}$-$\lambda_k$ of the incident electromagnetic energy are reflected. In an ideal system, the resonant wavelengths $\lambda_n$ are related to the cavity length by $\lambda_n$=2d/q, where q=1, 2, 3, . . . .

In optoelectronics, where FP cavities find particular utility, the typical optical response for reflected wavelengths is shown in FIG. 1B and the typical response for transmitted wavelengths is shown in FIG. 1C.

By varying the cavity length d, the FP cavity can be tuned to different resonant frequencies, thereby creating a tunable cavity resonator.

Figure 2A:
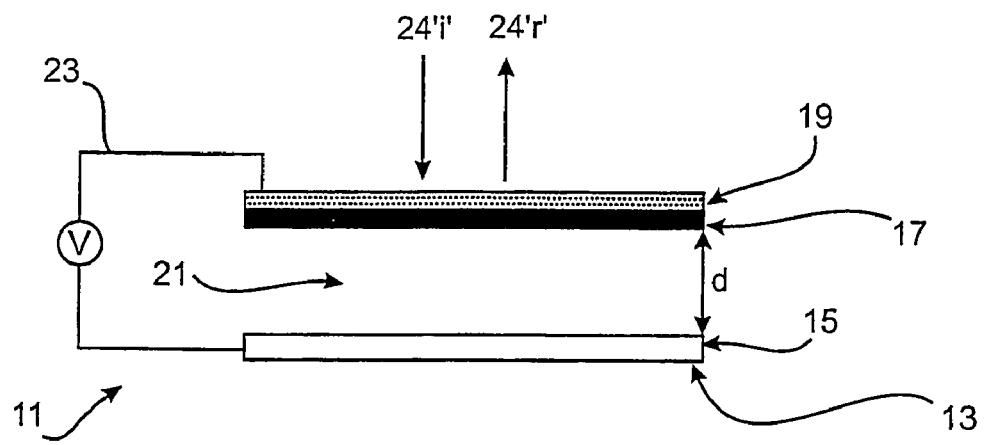
FIG. 2A is schematic diagram showing a side elevation of the conceptual realisation of a tunable cavity resonator formed as a MEMS structure on a substrate comprising MCT.

Applying MEMS technology to infrared detector technology leads to the conceptual realisation of the best mode for carrying out the present invention at the present time in the form of an infrared detector as shown in FIG. 2A.

Moreover, a tunable cavity resonator 11 for infrared wavelengths is provided comprising a layer of infrared sensitive material, which in the present mode is mercury cadmium telluride (HgCdTe) or MCT 13 on which is deposited a reflector 15 constituting one of the reflectors of an FP cavity. The reflector in the present mode is formed of a layer of gold/chromium (Au/Cr), however, the reflector may be formed of other materials suitable for the purpose of the invention. For example, the reflector may alternatively comprise a Bragg reflector stack, which would be adopted in a preferred embodiment of the invention.

A MEMS structure is fabricated on the IR sensitive material 13 and reflector 15 composite, in spaced relation thereto to constitute the other reflector of the FP cavity. The MEMS structure comprises a membrane of silicon nitride 17 formed by a plasma enhanced chemical vapour deposition (PECVD) of a thickness of approximately 100 to 300 nm and another reflector 19 of Au/Cr deposited thereon.

The cavity 21 defined by the spacing between the reflector 15 on the substrate and the membrane 17 of the MEMS structure is of a length d. The reflectors 15 and 19 double as electrodes of the FP cavity and a dc potential V is applied across these reflector electrodes by the circuit 23, creating an electrostatic force between the reflector electrodes across the cavity. This force is represented by the equation:

$$F_e(V) = (\epsilon/2)A(V/d)^2,$$

where
- $\epsilon$ is the permittivity of space in the cavity;
- A is the area of the electrode;
- V is the applied voltage; and
- d is the separation of the electrodes.

Thus as the voltage increases, the electrostatic force will similarly increase, moving the membrane, and be brought into balance by the increased tensile stress of membrane, resulting in a reduction in the cavity length d between the electrodes.

By changing the cavity length d, the detector can be tuned so that incident IR radiation 24'i' directed to the membrane side of the FP cavity is filtered allowing IR radiation at a prescribed wavelength to be transmitted through to the IR sensitive material side of the FP cavity, and the remaining IR radiation 24'r' is reflected. The MCT layer 13 can be connected to appropriate detection circuitry in known manner to constitute the IR detector.

Figure 2B:
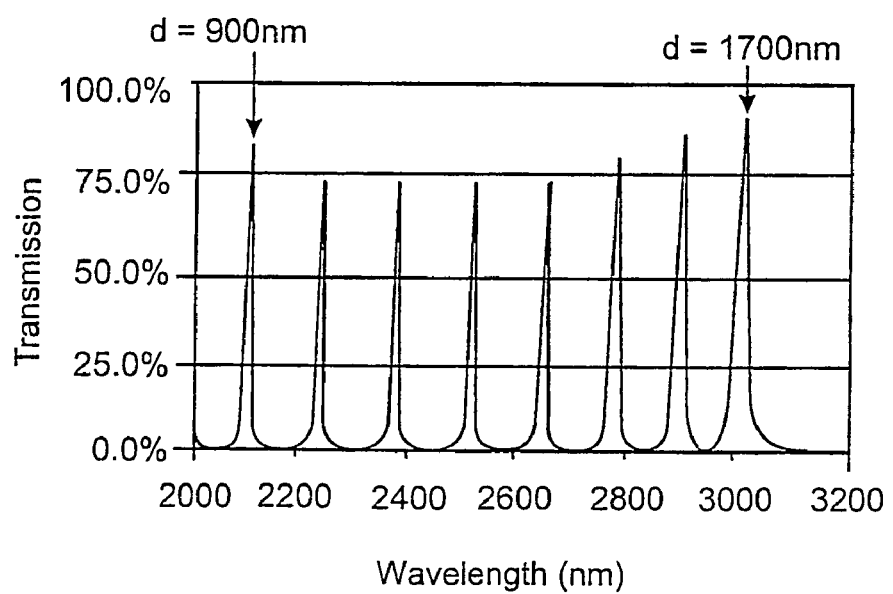
FIG. 2B is a graph showing an ideal optical response for the cavity resonator of FIG. 2A in transmission with the deformable membrane tuned to define different cavity lengths, showing the different resonant wavelengths corresponding thereto.

A typical response in terms of the percentage of the incident IR radiation 24'i' transmitted through the tunable cavity resonator 11 for selected wavelengths λ from 2000 nm to 3200 nm resulting from cavity lengths d ranging from 900 nm to 1700 nm is shown in FIG. 2B. These are plotted for 10° FOV (field of view), where the FWHM (full width half maximum) at 3000 nm is <20 nm, and approximately 25 nm at 15° FOV. An example of the practical application of the tunable cavity resonator is for detecting methane ($CH_4$), where IR wavelengths corresponding to $CH_4$ are located at λ=3017.39, 3111.73, 3115.85, and 3118.55 nm.

Figures 3A, 3B:
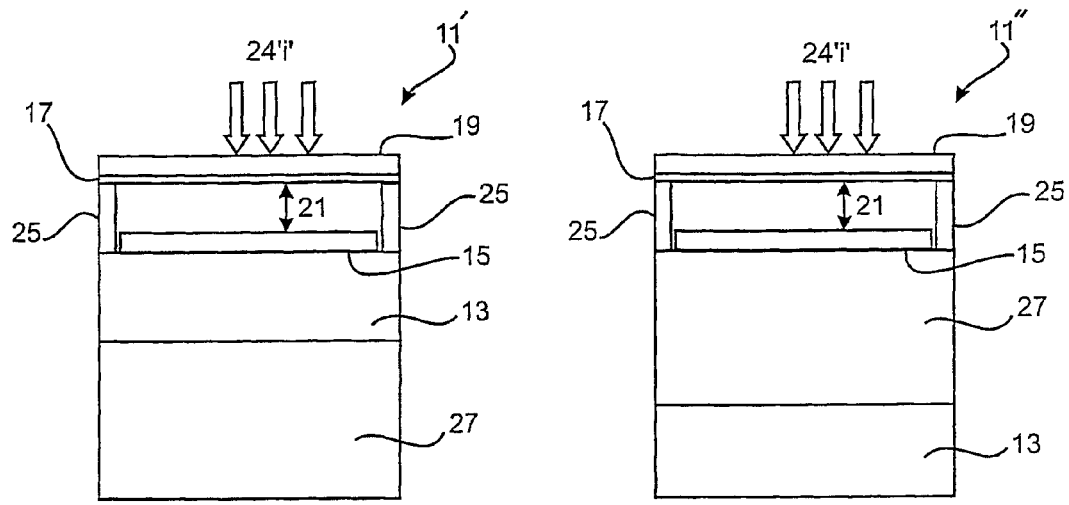
FIG. 3A is a schematic diagram showing a side elevation of the practical embodiment of a front-side illuminated IR detector.
FIG. 3B is a schematic diagram showing a side elevation of the practical embodiment of a back-side illuminated IR detector.
Figure 3C:
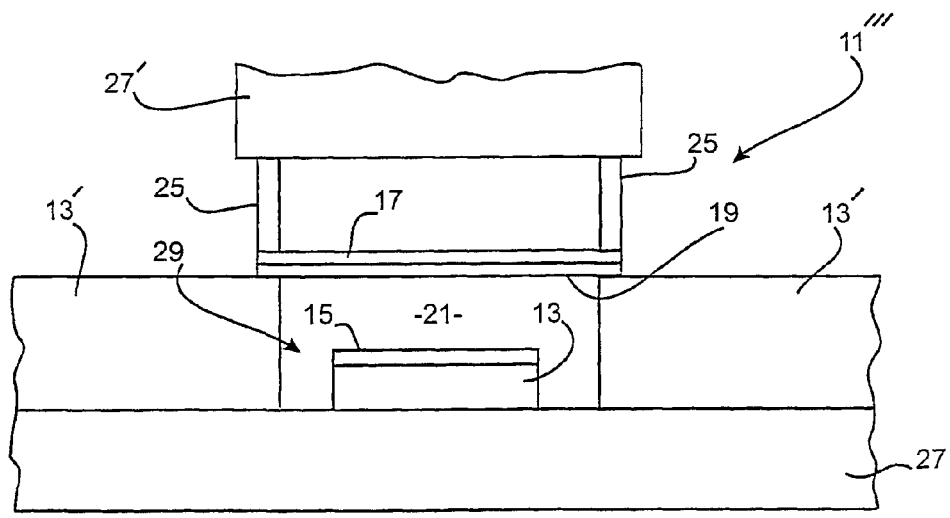
FIG. 3C is a schematic diagram showing a side elevation of the practical embodiment of a front-side illuminated cavity embedded IR detector.

The practical embodiment of the conceptual realisation of the IR detector of the best mode shown in FIG. 2A may take a variety of forms. Indeed the arrangement shown in FIG. 2A is generally along the lines of a front-side illuminated IR detector, the practical embodiment of which is shown in FIG. 3A of the drawings. However, a back-side illuminated IR detector as shown in FIG. 3B, can also be provided, as well as a front-side illuminated cavity embedded IR detector as shown in FIG. 3C.

In the case of the front-side illuminated IR detector of FIG. 3A, the tunable cavity resonator 11' involves the MEMS structure being mounted upon the IR sensitive material 13 by way of a support structure 25 disposed at the periphery of the membrane 17 to suspend the membrane in spaced relationship to the IR sensitive material. In the present mode, the support structure 25 is formed of polyimide. Furthermore, the IR sensitive material 13 constitutes the detector portion of the resonator and is actually grown on a substrate layer 27 that may be formed of one of the common commercial types, such as cadmium telluride or cadmium zinc telluride, or one of the newer substrate types still being researched, such as silicon or sapphire.

Figures 4A, 4B:
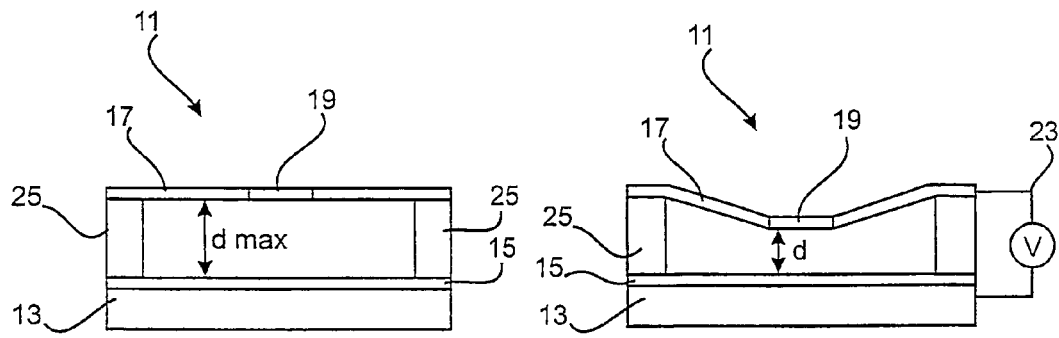
FIGS. 4A and 4B are similar views of a tunable cavity resonator conforming to the conceptual realisation of FIG. 2A, showing how the deformable membrane is displaced from the rest position shown in FIG. 4A with the maximum cavity length to the convergent position shown in FIG. 4B with a reduced cavity length.

As shown in FIGS. 4A and 4B, the major part of the top reflector electrode 19 is centrally disposed on the membrane 17 and maintains a planar disposition, parallel to the lower reflector surface 15 of the MCT layer 13, throughout the range of deflection of the membrane. Specific configurations of the top reflector will be described later.

In the case of the back-side illuminated IR detector shown in FIG. 3B, the positioning of the detector layer 13 and the substrate 27 are reversed, with the MEMS structure being mounted upon the substrate 27, as opposed to the layer of IR sensitive material 13. In this embodiment the substrate is effectively transparent to IR radiation passing through the FP cavity 21, so that it is detected by the MCT layer 13.

Front-side or back-side illumination configurations are adopted according to the specific detection application to facilitate wiring connections to the electrodes and to any associated read-out electronics.

The front-side illuminated cavity embedded IR detector arrangement shown in FIG. 3C is a two stage composite component that permits the MEMS structure to be fabricated separately of the detector and substrate component, the two being subsequently conjoined to form the integrated structure shown in the drawings. This arrangement has the benefit of accommodating the temperature sensitivities of the IR sensitive material like MCT, without compromising the higher temperature requirements that may be necessary for forming the MEMS membrane.

Moreover, the MCT layer 13' on the substrate 27 is etched to create a mesa layer of IR sensitive material 13 that functions as a detector, with a reflector layer 15 formed thereon to form one part of the FP cavity 21, within a greater cavity 29 in the MCT layer 13' itself. The MEMS structure is separately fabricated upon a separate substrate 27' with the membrane 17 formed using any appropriate deposition technique, such as PECVD or LPCVD, and sacrificial etching, as will be subsequently described. In this manner the membrane 17 is supported on the polyimide supports 25 and the other reflector 19 formed on the membrane itself. The resultant MEMS structure is then separated off, reversed and carefully disposed to surmount the cavity 29 so that the membrane 17 and reflector 19 are juxtaposed and fixedly conjoined with the top of the MCT layer 13' either by Van der Waal's forces or adhesive such as epoxy.

The separate substrate 27' is transparent to incident IR radiation so that it may pass through to the FP cavity 21 for filtering. Tuning of the cavity is performed by the application of an electrostatic force between the reflectors 15 and 19, whereby the membrane 17 is moveable to adopt the requisite spacing between the reflectors.

Figure 4C:
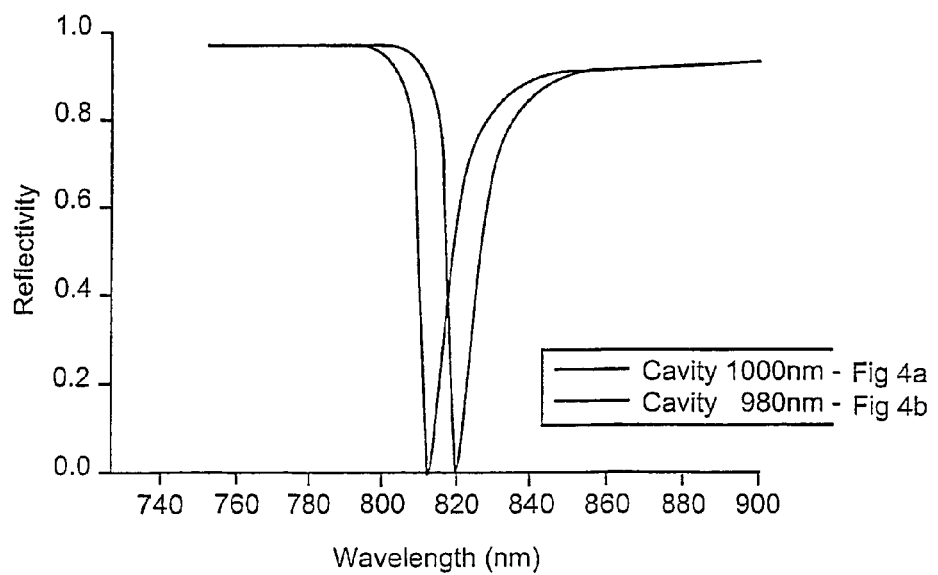
FIG. 4C is a graph showing the optical response for the cavity resonator of FIGS. 4A and 4B in reflection with the membrane disposed in the respective positions.

Now describing the tuning of the cavity resonator 11 in more detail, regard is had to the front-side illuminated IR detector arrangement. As shown in FIG. 4A, the membrane 17 is disposed in a rest position defining a maximum cavity length $d_{max}$, and in FIG. 4B, the membrane is deformed under the attractive electrostatic force created by application of the potential V across the reflector electrodes, decreasing the cavity length to d' and changing the resonant point of the cavity. FIG. 4C shows the change in the resonant wavelength of the cavity in terms of the reflectivity of the incident IR radiation for the position of the membrane in FIGS. 4A and 4B respectively.

It should be noted that the resultant cavity resonator of the present mode has several characteristics that distinguish it from previously known cavity resonators. Moreover, the IR sensitive material is of Group II-VI semiconductors, namely MCT, which requires comparatively low processing temperatures. The membrane is of silicon nitride formed using PECVD, so that the intrinsic stress in the membrane is such that the resultant stress in the released membrane is balanced between tensile and compressive stresses, i.e. is of controlled and very low stress, to provide a uniform and flat film in suspension above the IR sensitive material, having the requisite morphology and integrity for proper functioning with MCT or another substrate operating with IR wavelengths.

It should be appreciated that fabricating a tunable cavity resonator of the type described having a membrane that can be sufficiently deformed to vary the cavity length to provide for tuning in IR wavelengths is not trivial, and indeed forming such a membrane on delicate materials such as MCT is even more complex.

As is apparent from the foregoing description, the magnitude of the cavity length with the membrane in the rest or relaxed position must be in the order of the wavelengths of interest. Thus with wavelengths in the IR or near IR region, the cavity length needs to be in the order of 1 to 10 micron. This distance is significantly less than that which can be achieved through bulk KOH etching of a silicon substrate for releasing a large enough membrane area to create the top movable reflector. To achieve such dimensions with membranes formed of PECVD silicon nitride and surface micromachining, an alternative to the standard $SiO_2$ sacrificial layer must be employed to support the membrane during the processing steps prior to release. When fabricating suspended structures where LPCVD is used to form the membrane, $SiO_2$ can be used as the sacrificial layer. However, the etch selectivity of the conventional $SiO_2$ sacrificial layer over PECVD deposited silicon nitride membrane film is lower than that for LPCVD $SiN_x$. The higher etch rate of the PECVD silicon nitride becomes significant when dealing with microstructures due to the long etch times required to completely release the central membrane area. The long etch time together with the low selectivity lead to significant etching of the thin silicon nitride membrane, ultimately leading to device failure through collapse or, non-uniform membrane topology.

To take advantage of the benefits of the PECVD process to deposit the silicon nitride membrane, the preferred embodiment for fabricating tunable cavity resonators uses a sacrificial zinc sulphide (ZnS) layer. ZnS is rapidly etched in HCl, which has a very high selectivity over PECVD silicon nitride. ZnS is also etchable using a $CH_4/H_2$ reactive iron etching (RIE) plasma. Since the PECVD silicon nitride is deposited conformly over the sacrificial layer, the ability of RIE to create small, anisotropic, geometric features allows for the formation of complicated three dimensional structures such as corrugations in the membrane layer.

A 1 μm thick, thermally evaporated ZnS film deposited onto an Au/Cr covered silicon substrate has a compressive stress in the order of 340 MPa at room temperature that increases to approximately 400 MPa at a temperature of 300° C. Therefore, to create a low stress silicon nitride membrane in the final released device, it is necessary to increase the intrinsic tensile stress in the silicon nitride membrane during its formation. As a result of various experiments conducted using PECVD, it has been established that this can be achieved a number of ways.

Figure 5:
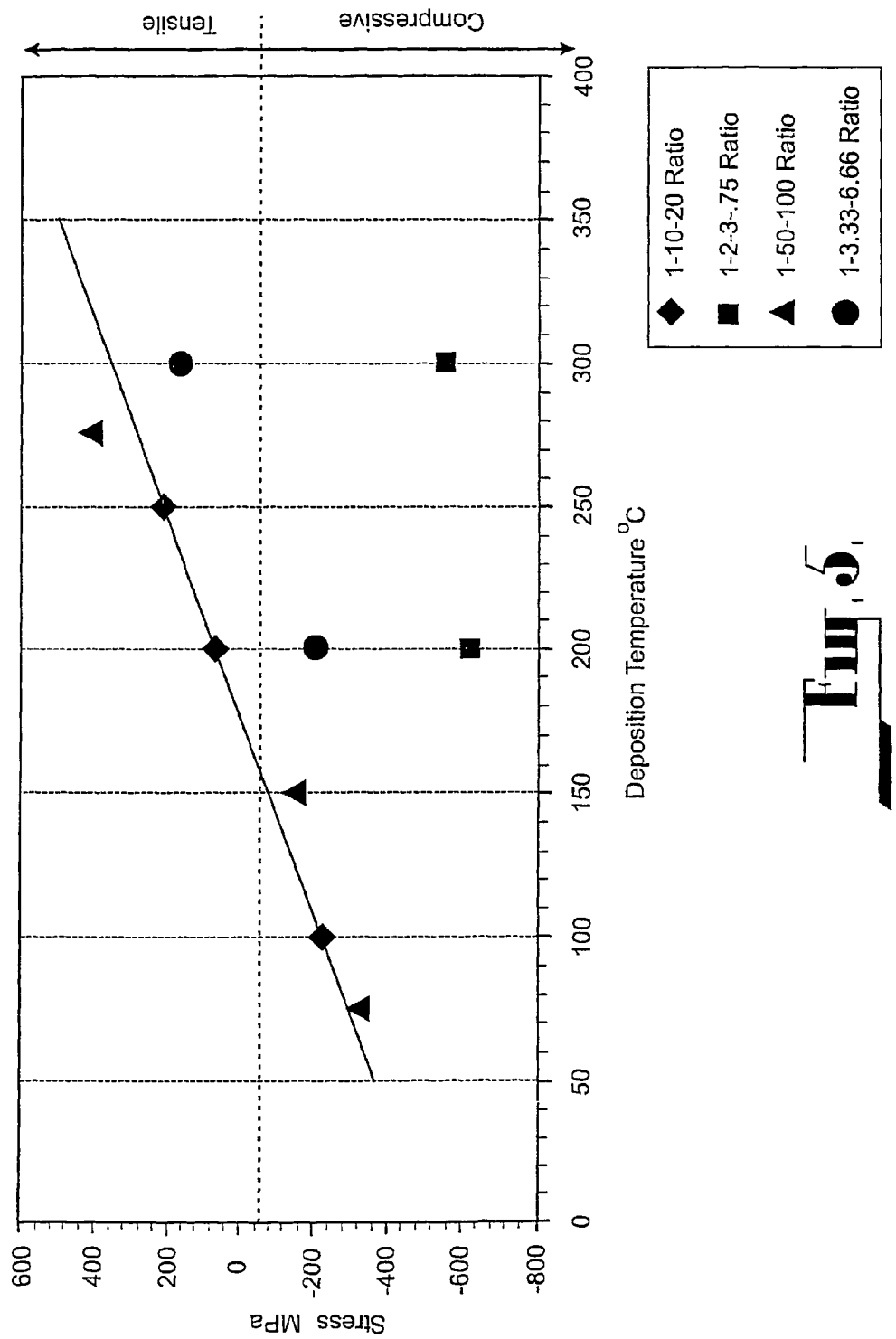
FIG. 5 is a graph of PECVD silicon nitride stress as a function of deposition conditions using a process gas mix of silane:ammonia:nitrogen ($SiH_4$:$NH_3$:$N_2$)

As shown in FIG. 5 of the drawings, a graph of PECVD silicon nitride stress as a function of deposition conditions indicates that there is a strong correlation between film stress and the deposition temperature for a given gas flow ratio. In arriving at this graph, experiments were conducted to characterise the thin film stress of optically flat PECVD silicon nitride, using high resistivity, [100] double-sided polished 280 μm thick silicon substrates. Deposition temperatures from 75° C. to 300° C. were used, coupled with process gas ratios with constant RF power (100 W) and process pressure (450 mtorr).

As can be seen, as the PECVD temperature is decreased, there is a corresponding increase in the compressive nature of the film. For a gas flow ratio 1:$SiH_4$, 10:$NH_3$, 20:$N_2$, a deposition temperature of 175° C. yields a very low stress system. The graph also indicates that for a given temperature, as the ratio of silane to other gases is increased, the film become progressively more compressive. However, there is not a large corresponding change in the tensile nature of the film if the silane gas flow ratio is decreased further from 1:10:20 to 1:50:100, $SiH_4$:$NH_3$:$N_2$. Thus there is a large window of temperature and gas flow ratio conditions that can be altered to tailor the stress over a wide range of stresses (from 400 MPa tensile to 600 Mpa compressive).

In the case of using a silicon substrate, which is not averse to higher temperature deposition techniques, increasing the deposition temperature is one way of increasing the intrinsic tensile stress in the membrane. However, with using a substrate that is averse to higher temperatures, such as MCT, which is used in the case of the best mode, other ways of achieving this may be employed using PECVD, such as varying the process gas flow ratio, as can be seen from the graph in FIG. 5, RF power and/or RF frequency. Alternative deposition techniques such as inductively coupled plasma chemical vapour depostion (ICPCVD) can also be used.

For the purpose of forming a silicon nitride membrane with a silicon substrate using PECVD, the PECVD temperature is increased to approximately 300° C. This increase in the deposition temperature increases the tensile intrinsic stress in the silicon nitride membrane. The large tensile stress in the membrane is then compensated by the compressive stress in the sacrificial layer so that resultant stress in the finally released silicon nitride layer is relatively low. Low resultant stress is important as it allows membranes to be designed that can be electrostatically displaced over large distances using low voltages.

Thus an important aspect of the best mode of the present invention is forming the tunable cavity resonator device in a manner whereby the intrinsic stress in the membrane is controlled during the fabrication process. Thus, the resultant stress in the membrane on release is controlled so as to be close to zero, or sufficiently low, so as to allow for adequate and responsive movement to an electrostatic force applied in proportion to the magnitude of an applied voltage across the electrodes, the movement being sufficient to tune the resonator device in the order of the resonant wavelengths being filtered by the cavity.

It should also be appreciated that whilst the best mode of the invention has been described specifically with respect to a tunable cavity resonator comprising a detector layer formed of MCT, other modes for carrying out certain aspects of the invention with respect to tunable cavity resonators comprising a detector layer formed of materials other than MCT also exist.

Similarly, whilst the best mode of the invention has also been described identifying the detector as simply a layer of IR sensitive material, in practice there are a number of different detector types suiting particular applications to which the invention is applied that affect the ultimate configuration of the tunable cavity resonator. These different detector types are shown formed with their corresponding substrate as applicable in FIGS. 6A to 6E.

Figure 6A:
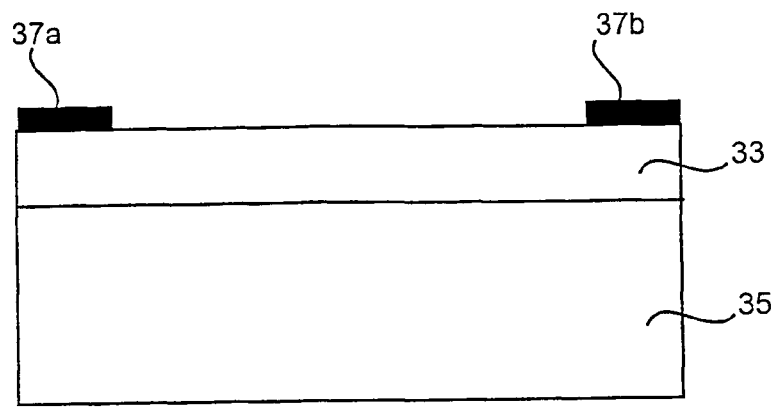
FIG. 6A is a cross-sectional schematic diagram of a photoconductor detector type.

As shown in FIG. 6A, the detector type is a photoconductor 31, which simply comprises a layer of IR sensitive material 33 such as MCT grown on a substrate 35, where contacts 37a and 37b are disposed at spaced apart locations on the IR sensitive material layer. In the case of the various configurations shown in FIGS. 3A to 3C, the IR sensitive material layer 33 corresponds to the detector layer 13 and the substrate 35 corresponds to the substrate layer 27.

Figure 6B:
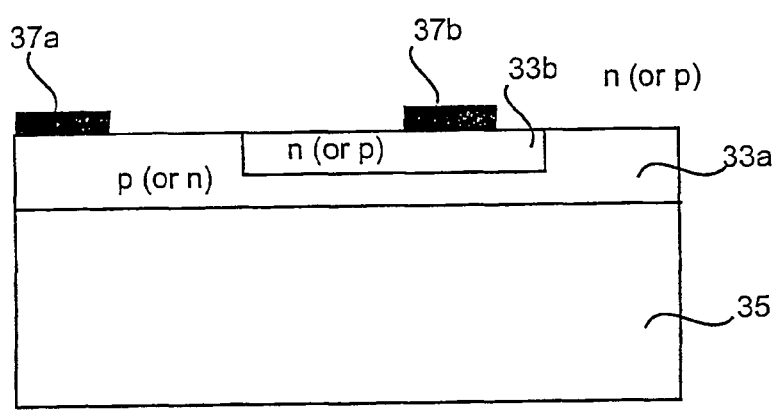
FIG. 6B is a cross-sectional schematic diagram of one arrangement of a horizontal junction photodiode or avalanche photodiode detector type.
Figure 6C:
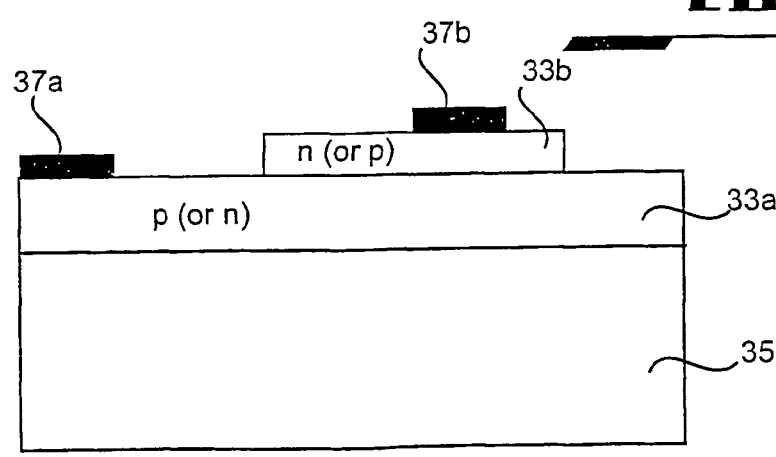
FIG. 6C is a cross-sectional schematic diagram of another arrangement of a horizontal junction photodiode or avalanche photodiode detector type.

In FIGS. 6B and 6C, alternative arrangements of horizontal junction photodiodes or avalanche photodiodes are shown, where the IR sensitive material layer 33 comprises a predominantly horizontal n-p or p-n junction.

In the case of FIG. 6B, the horizontal junction photodiode 39 has an n (or p) portion 33b type converted within a p-type (or n) layer 33a to form the IR sensitive material layer 33, with contacts 37a and 37b respectively mounted upon the layer 33a and the portion 33b.

In the case of FIG. 6C, the horizontal junction photodiode 41 has a p-type (or n) layer 33a grown on the substrate 35, followed by an n-type (or p) layer 33b grown on the preceding layer 33a, whereby the layer 33b is etched to reveal part of the surface of the layer 33a for disposing a contact 37a with the other contact 37b disposed on the layer 33b.

Figure 6D:
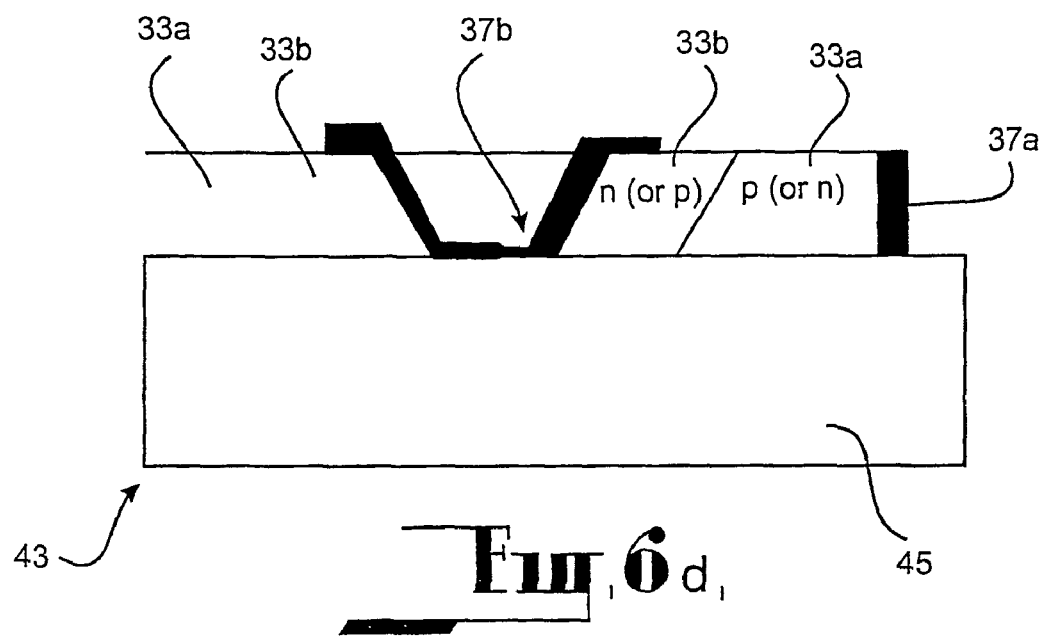
FIG. 6D is a cross-sectional schematic diagram of one arrangement of a vertical junction photodiode or avalanche photodiode detector type.
Figure 6E:
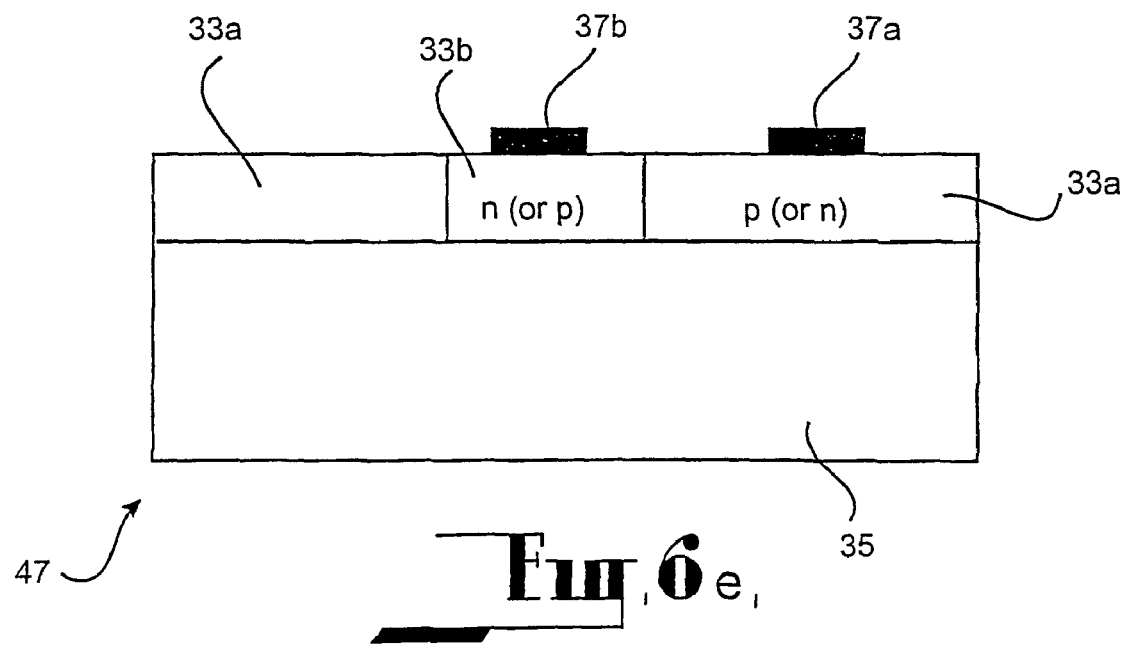
FIG. 6E is a cross-sectional schematic diagram of another arrangement of a vertical junction photodiode or avalanche photodiode detector type.

In FIGS. 6D and 6E, alternative arrangements of vertical junction photodiodes or avalanche photodiodes are shown, where the IR sensitive material layer 33 comprises a predominantly vertical n-p or p-n junction.

In the case of FIG. 6D, the vertical junction photodiode 43 has a p-type (or n) layer 33a directly adhered to the read out integrated circuit (ROIC) electronics 45 and an n-type (or p) layer 33b type converted within a portion of the layer 33a right through to the ROIC so that it also is directly adhered to the ROIC electronics 45, whilst forming a vertical junction with layer 33a. The contact 37a is vertically disposed on the end of the layer 33a, and the contact 37b surmounts the opposing ends of the interposed layer 33b to conjoin them.

In the case of FIG. 6E, the vertical junction photodiode 47 has a p-type (or n) layer 33a grown on the substrate 35, with an n-type (or p) layer 33b type converted within a portion of the layer 33a right through to the substrate 35 so that it forms a vertical junction with the layer 33a. Contacts 37a and 37b are respectively disposed on the upper surface of the layers 33a and 33b.

Accordingly several embodiments of fabricating a tunable cavity resonator will now be described, the first embodiment describing the construction of a tunable cavity resonator formed on a silicon substrate, and the second embodiment describing the construction of a tunable cavity resonator formed ultimately on a layer of MCT.

The first embodiment of fabricating a tunable cavity resonator is made with reference to FIG. 7 of the drawings.

Figure 7A:
FIGS. 7A to 7H are schematic side elevations and isometric views showing the sequence of steps involved in fabricating a MEMS structure in the form of an FP cavity directly upon a substrate in accordance with the first embodiment of the best mode.

As shown in FIG. 7A, a chrome/gold layer 51 of 2 nm chrome and 50 nm gold is thermally evaporated on to a silicon substrate 53 to act as the lower reflector as well as the lower electrode of the cavity. This layer 51 is also required to promote adhesion between the zinc sulphide sacrificial layer and the silicon substrate during the PECVD process. Without this layer, the adhesion of the sacrificial layer to the silicon substrate would be so low that during the PECVD process at 300° C., thermal stresses between the two materials would cause the sacrificial layer to peel off from the substrate.

Figure 7B:
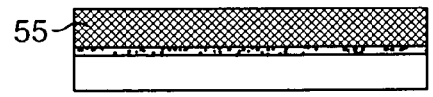

As shown in FIG. 7B, the zinc sulphide sacrificial layer 55 is then thermally evaporated onto the substrate composite of FIG. 7A, the thickness of this layer corresponding to the final relaxed cavity length of the resultant cavity resonator. During the sacrificial layer deposition, the silicon substrate 53 is held at an elevated temperature of 80° C. to assist in the adhesion between the zinc sulphide layer 55 and the substrate composite of FIG. 7A.

Figure 7C:
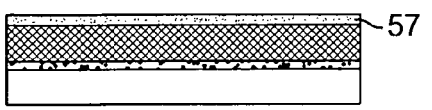

As shown in FIG. 7C, the PECVD silicon nitride membrane layer is deposited under the conditions shown in table 1 below. This membrane layer 57 forms part of the top reflector assembly that is displaced under an applied electrostatic force.

TABLE 1

The PECVD Process conditions used to fabricate MEMS structures.

| | | $SiN_x$ on Si | | $SiN_x$ on ZnS | |
|---|---|---|---|---|---|
| Process Gas | $SiH_4$ | 5 | sccm | 5 | sccm |
| Flow | $NH_3$ | 50 | sccm | 50 | sccm |
| | $N_2$ | 100 | sccm | 100 | sccm |
| RF Power | | 100 | W | 100 | W |
| RF Frequency | | 13.56 | MHz | 13.56 | MHz |
| Process Temperature | | 200° | C. | 300° | C. |
| Process Pressure | | 450 | mtorr | 450 | mtorr |

As previously described, the ZnS sacrificial layer is compressively stressed, since depositing an $SiN_x$ layer with neutral, or only slightly tensile, stress leads to subsequent device collapse upon release. In order to counter the compression stress in the structure due to the ZnS layer, the $SiN_x$ is deposited with tensile intrinsic stress produced through an increased deposition temperature for a given gas flow ratio. This stress compensation is designed to allow the released structure to have very little resultant stress, so that only a small applied voltage is required to displace the membrane to the maximum controllable limit.

Figure 7D:
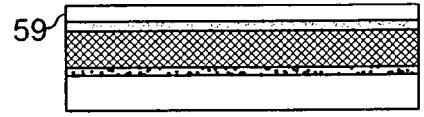
Figure 7E:
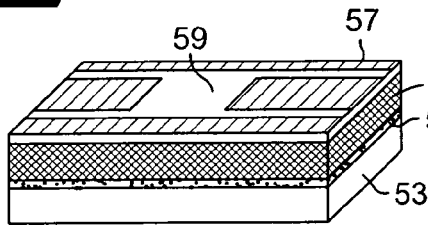

As shown in FIG. 7D, using the "lift off" technique, a thin layer of Cr (1 nm)/Au (30 nm) 59 acts as the top reflector and electrode of the cavity. The pattern of this deposited Cr/Au layer 59 is shown in FIG. 7E and represents the final geometry of the membrane 57 used in the cavity resonator.

Figure 7F:
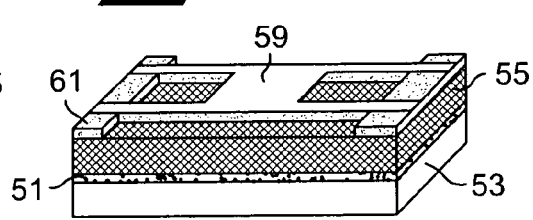

RIE using a $CF_4$ plasma is employed to remove the silicon nitride layer as shown in FIG. 7F, in accordance with the pattern of the membrane geometry.

Figure 7G:
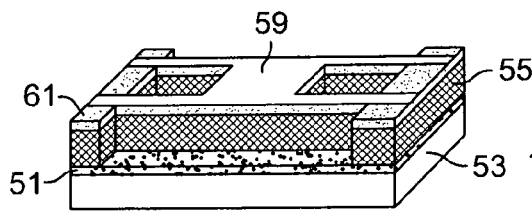

The removal of the ZnS sacrificial layer is achieved using a two-stage wet HCl etch process. The first HCl dip removes the ZnS 55 around the membrane 57, as shown in FIG. 7G of the drawings, but is timed so there is no substantial undercutting of the ZnS beneath the membrane 57 or membrane support 61. Subsequently, an AZ photoresist 63 is used to protect the ZnS layer under the $SiN_x$ support 61 from etch to prevent any undercut thereof.

Figure 7H:
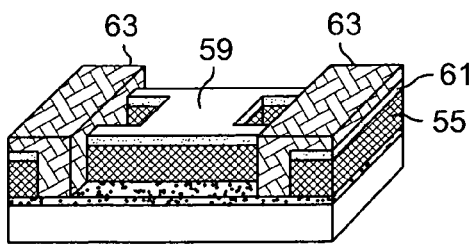
Figure 7I:
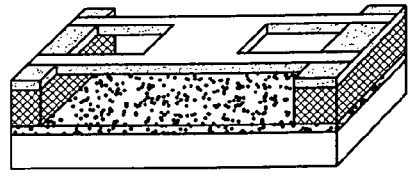

As shown in FIG. 7H, the final release etch is achieved using HCl heated to 80° C., whereby a total undercut of the remaining membrane is accomplished. Typically, a 100 μm square membrane can have the sacrificial layer completely etched in approximately 2 minutes.

The released structures are then rinsed in running distilled-deionised (DD) water for 10 minutes, followed by removing the AZ photoresist 63 using acetone.

The resultant cavity resonator 65 devices are then again rinsed in DD water for a further 10 minutes.

To avoid the effects of stiction between the membrane 57 and the substrate composite, the device is dried using what is known as the $CO_2$ critical point drying method. The device is then dehydrated via progressive acetone soaks, before being placed in a critical dryer.

After critical point drying, the cavity resonator device is mounted on a standard chip carrier and bonded using gold ball bonding techniques. Due to the very low stress in the membrane, together with the small dimensions of the cavity, any static charge present during the bonding process can lead to device collapse.

Therefore, anti-static precautions are essential in order to protect the resultant cavity resonator device 65.

Whilst the first embodiment is advantageous in relation to fabricating tunable cavity resonators using the ZnS/PECVD silicon nitride material system in that it realises in itself a reduction in processing temperatures for MEMS fabrication, the semiconductor material or device on which the MEMS structure is to be constructed is still exposed to temperatures in the order of 300° C. Thus, in order to fabricate the tunable cavity resonator described in the best mode for carrying out the invention a methodology is required that further reduces the processing temperatures for MEMS structures on semiconductors, such as MCT, that are susceptible to damage at temperatures in the order of 300° C., and indeed require processing at temperatures below 90° C.

Although silicon nitride can be deposited using the PECVD process at temperatures significantly lower than 300° C., several critical issues arise. As the deposition temperature is decreased, the intrinsic stress in the membrane changes from tensile to compressive, resulting in membranes that collapse after the sacrificial layer has been removed. More significantly, at deposition temperatures below 200° C., the morphology and integrity of the film can decrease rapidly due to the formation of a high density of pinholes.

To retain the advantageous properties of PECVD silicon nitride, either the deposition temperature must remain at, or be close to, 300° C., or alternative deposition conditions be used that avoid the formation of pinholes.

Accordingly, the second embodiment of the invention is directed towards a methodology that effectively fabricates the MEMS structure separately of the final temperature sensitive device, which in the second embodiment is the MCT substrate, and instead performs these fabrication steps of the MEMS structure on a gallium arsenide (GaAs) substrate. The completed structure is then transferred from this GaAs substrate through a heat activated flotation process to the final device substrate, which in the present embodiment is MCT. In this manner the final device, having never been subjected as a whole to any of the high temperature fabrication steps required for the MEMS structure, realises the low temperature processing constraint.

Now describing the second embodiment in more detail, reference is made to FIGS. 8 and 9 of the drawings.

As shown in FIG. 8A, a Cr/Au mask layer 71 is deposited on a GaAs substrate 73. A 3 μm thick sacrificial layer of ZnS 75 is then thermally deposited onto the substrate composite of FIG. 8A, as shown in FIG. 8B.

ZnS is normally thermally deposited with high intrinsic compressive stress onto a silicon or Si substrate, as ZnS has low adhesion to Si, but adheres much better to a bare GaAs wafer with no peeling after deposition. However, during the PECVD $SiN_x$ membrane deposition process, the ZnS nonetheless sometimes peels from the substrate. This is believed to be due to the differential expansion between the two materials. Thus, the thin layer of Cr/Au 71 is first deposited on to the substrate 73 to enhance the adhesion between the ZnS and GaAs substrate, acting as a buffer layer for thermal expansion during the PECVD process and for the compressive stress present between the ZnS layer and the substrate.

The thickness of the ZnS layer 75 corresponds to the dimension of the air gap that is required under the released silicon nitride membrane.

Next, as shown in FIG. 8C, a silicon nitride layer 77 is then deposited on to the sacrificial layer 75 using PECVD. In the present embodiment, the PECVD process used is performed under the conditions shown in table 2 below:

TABLE 2

Silicon Nitride PECVD process parameters.

| Process Gases | Gas Flow (sccm) |
|---|---|
| $SiH_4$ | 20 |
| $NH_3$ | 45 |
| Ar | 70 |
| RF Power | 100 W |
| RF Frequency | 13.56 MHz |
| Process Temperature | 300° C. |
| Process Pressure | 300 mTorr |

Under these conditions, the silicon nitride membrane film has sufficient intrinsic stress to prevent membrane collapse when it is released from the sacrificial layer.

It should be appreciated that in practice, a plurality of membranes are formed simultaneously on the one substrate to create an array of tunable cavity resonator devices in the one structure, or be later separated by known means to form individual structures. Depending on the ultimate structure being formed, as shown in FIG. 8D, the resultant device is then patterned to produce mesa structures 79 of $ZnS/SiN_x$ at prescribed locations.

Polyimide 81 is then spun on top of the mesa structures 79, as shown in FIG. 8E, to support the membrane after the sacrificial layer has been removed. The polyimide layer 81 allows for the successful transfer of the suspended structures to the final device substrate that will be described in more detail later. Windows 83 to the silicon nitride layer 77 are opened in the polyimide 81 and the resultant structure is cured in an $N_2$ environment by ramping the temperature at 10° C. per minute to 200° C., holding for two hours, then ramping to 300° C. and holding for a further one hour.

Figure 9C:
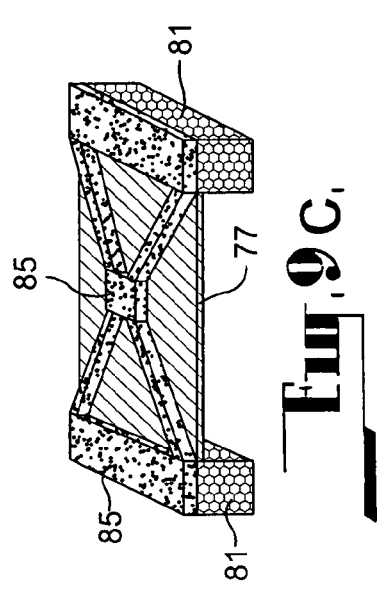
FIGS. 9A to 9D are schematic isometric views showing the transfer sequence of the MEMS structure of FIG. 8 and the patterning of the membrane after it has been transferred.
Figure 9D:
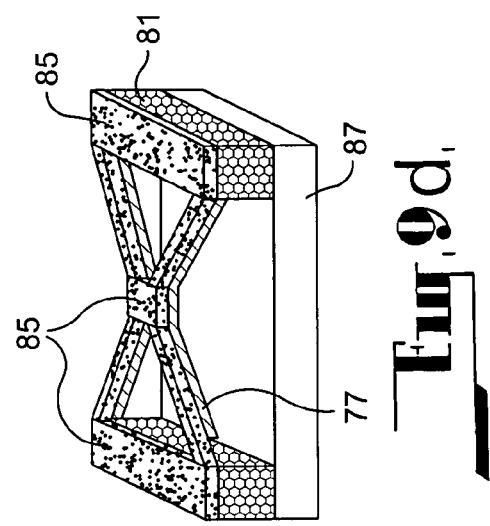
Figure 9A:
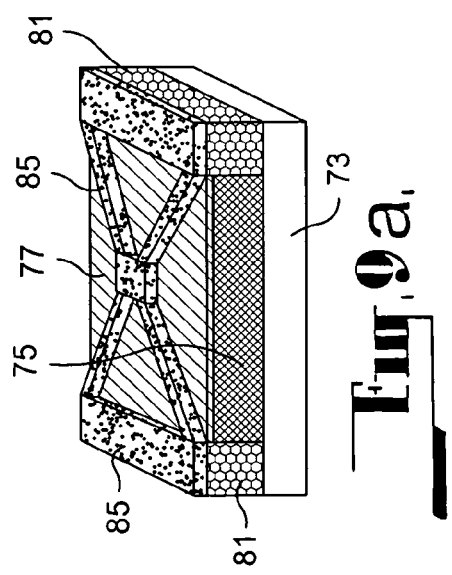

A gold layer 85 is then deposited and patterned as shown diagrammatically in FIGS. 8F and 9A using a lift off technique. RIE in a $CF_4$ plasma is used to create individual membrane areas of various dimensions, before the sacrificial ZnS layer 75 is finally removed using a wet etch such as HCl to release a plurality of membranes that are held in a polyimide reticule. The membranes are then rinsed in distilled-deionised water to produce the resultant device as shown in FIG. 8G.

To reduce the problem of stiction between the membrane and substrate, the device is dehydrated via progressive acetone soaks and finally dried in elevated temperatures of 80° C., as described in the first embodiment.

Figure 9B:
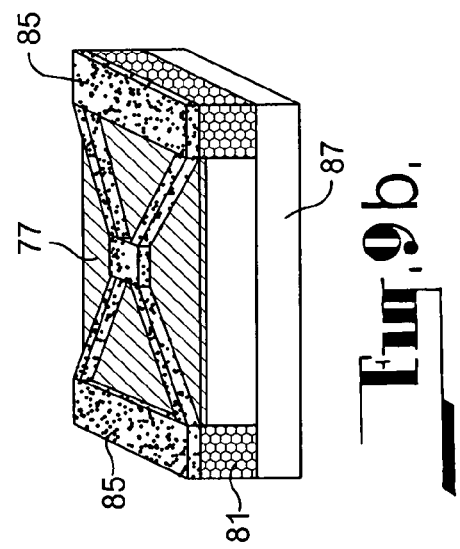

As shown in FIGS. 8H and 9B, the resultant MEMS structure is lifted off using a heat activated flotation separation process. In this process, the polyimide 81 is separated from the GaAs substrate device 73 (the process substrate) and placed on the new MCT substrate 87, to which it adheres through van der Waals bonding. The polyimide 81 during this transfer process, as shown in FIGS. 8H and 8I, remains flat and provides support for one or more membranes that are embedded in it.

The flotation separation process involves soaking the polyimide 81 and dummy GaAs substrate 73 in an ethanol solution whilst applying a small amount of heat to the underside of the substrate. The heat induces the polyimide layer to separate from the substrate and flow to the surface of the ethanol.

The resultant polyimide reticule can then be transferred to the new MCT device substrate 87, as shown in FIG. 8I where the van der Waals forces hold it in place as shown in FIGS. 8J and 9C.

Thinning and all patterning of the transferred membrane is possible thereafter by using a post transfer RIE step to etch the silicon nitride membrane 77. Such "after transferring" patterning process steps have the advantage that they allow small fragile features to be present in the final membrane which could otherwise be damaged during the flotation process.

As previously described, the application of the gold layer 85, as shown in FIGS. 8F and 9A of the drawings, is applied as a mask to the silicon nitride membrane 77 and patterned using a lift off process, before the device is separated from the GaAs substrate 73. The pattern of the Au layer 85 reflects the geometry of the final membrane required, since the Au layer 81 acts as the mask in the RIE patterning step. This Au layer can be fully removed once the $SiN_x$ layer 77 has been patterned by adjusting the RIE power during the membrane pattern etch, as shown in FIGS. 8K and 9D, after the transfer to the new MCT substrate 87 has been perfected.

Consequently, a tunable cavity resonator is constructed of the type described in the best mode for carrying out the invention.

The third embodiment of the invention is substantially the same as the previous embodiment, without transferring the MEMS structure from the GaAs substrate to the MCT substrate, so that the final device is actually formed on the GaAs substrate.

Moreover, after the ZnS sacrificial layer is removed by wet etching, the device is rinsed and dried. The drying stage is most critical due to the adhesion effects of surface tension forces in the rinse liquid. A layer of rinse liquid is effectively trapped under the membrane (in the cavity) during the rinse process. As the device dries, this liquid evaporates causing strong surface tension forces to be exerted between the substrate and the membrane. These forces pull the membrane down into contact with the substrate when Van der Waals forces often create permanent adhesion, rendering the device useless.

To overcome this problem, the device is rinsed in distilled-deionised water followed by an acetone soak to dehydrate the device.

A rinse solution of 50% acetone and 50% t-butyl alcohol follows this soak. The concentration of t-butyl alcohol in acetone is progressively increased until a 100% t-butyl alcohol solution is reached whereupon the device is cooled to −10° C. solidifying the t-butyl alcohol. The solid t-butyl alcohol on the device is then removed via sublimation under vacuum.

This rinse and dry method removes the strong surface tension forces that would normally exist during the drying process resulting in an increased yield of FP cavities from around 10% to 90%.

As previously described, there are other ways of avoiding the formation of pinholes in the membrane and thus maintain the morphology and integrity of the film than by using a high deposition temperature. From the experiments conducted to produce the graph shown in FIG. 5 of the drawings, altering the process gas flow ratio to increase the ratio of silane to other gases also reduces the intrinsic stress of the membrane allowing the deposition temperature to be reduced. When combined with RF frequency and RF power control, essentially any desired deposition temperature can be adopted to suit the substrate or other material using PECVD, and still achieve membrane films with good morphology and integrity by controlling the density of pinhole formation therein.

Accordingly other embodiments of the invention, similar to the first and third embodiments, are provided which allow for the direct formation of a MEMS structure upon any particular layer using PECVD or other suitable deposition technique.

Accordingly a fourth embodiment is provided substantially identical to the first and third embodiments, except that the substrate has an IR sensitive layer grown thereon of MCT and the deposition technique parameters are altered to enable the membrane to be deposited at a temperature in the order of 70-90° C. with the MCT layer in situ.

In this embodiment, the gas flow ratio for parts of silane to ammonia to nitrogen is still selected to be in the order of 1:10:20, however the RF power is reduced to suit the specific deposition temperature required for MCT, but still provide the requisite level of intrinsic stress in the membrane so that on release it is equal to or proximate to zero As previously discussed in relation to the best mode, ideally the reflector portion of the membrane needs to maintain a planar disposition, in parallel relationship with the fixed portion of the reflector on the detector/substrate layer, throughout its prescribed range of movement, or near enough to such, to provide for a high Q (quality) factor, which is required for high finesse cavities. As the membrane needs to be supported at its periphery, the geometry of the membrane can play an important role in mitigating the degree of curvature in the central portion thereof, where the reflector is disposed.

As shown in the first embodiment, the membrane geometry is patterned to adopt an H or saddle suspension configuration, as shown in FIGS. 7E to 7H. As shown in the second embodiment, the membrane geometry is patterned to adopt a cross or diagonal suspension configuration, as shown in FIG. 9.

Using finite element modelling (FEM), the mechanical response of the membrane to an applied electrostatic force can be analysed so as to ascertain an optimal geometry to use for the tunable cavity resonator of the best mode of the invention.

Figure 10A:
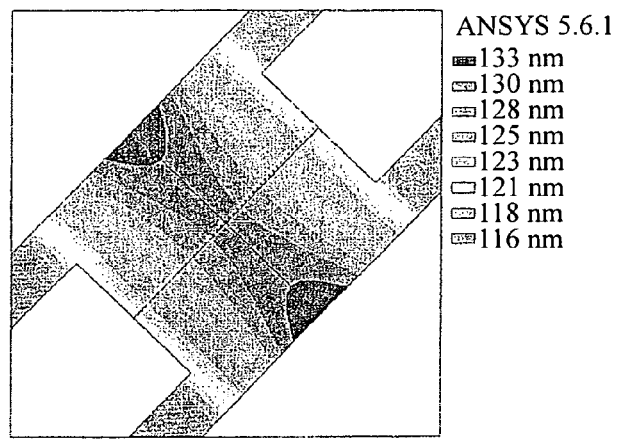
FIGS. 10A to 10C are plan views showing alternative reflector designs for the membrane used in either embodiment.
Figure 10B:
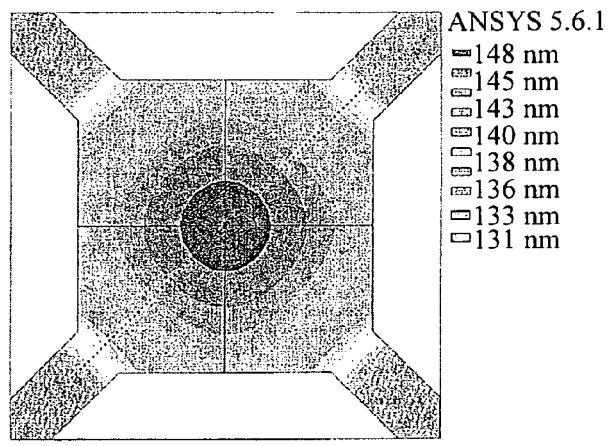
Figure 10C:
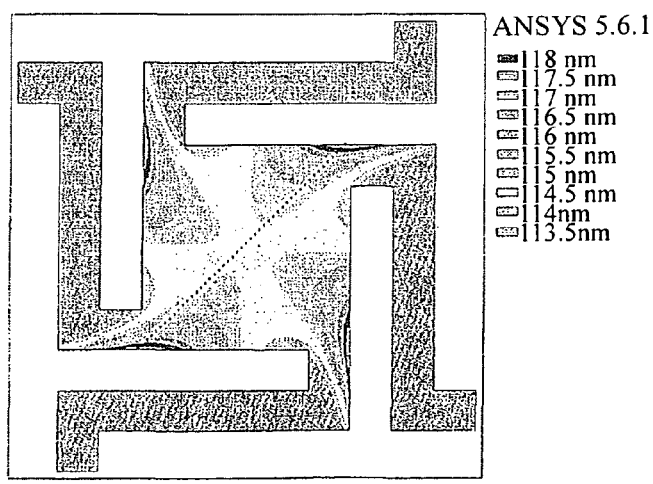

The results of the FEM analysis on three specific configurations are shown in FIG. 10. These configurations correspond to:
  an H or saddle suspension configuration shown in FIG. 10A,
  a cross or diagonal suspension configuration shown in FIG. 10B, and
  a swirl suspension configuration shown in FIG. 10C.

Figure 11A:
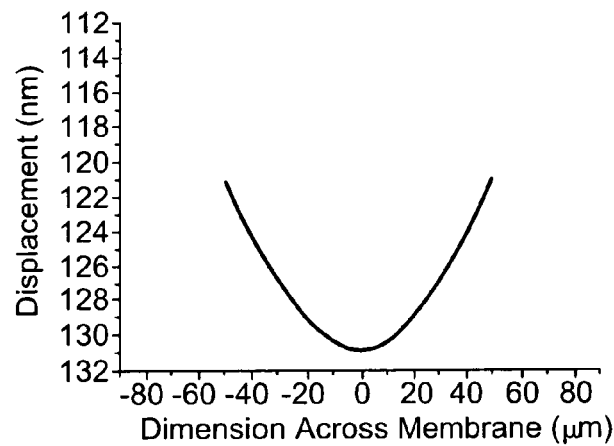
FIGS. 11A to 11C are graphs showing the bending finite element analysis of the membrane across the central area shown in dotted outline in the corresponding designs of FIGS. 10A to 10C.
Figure 11B:
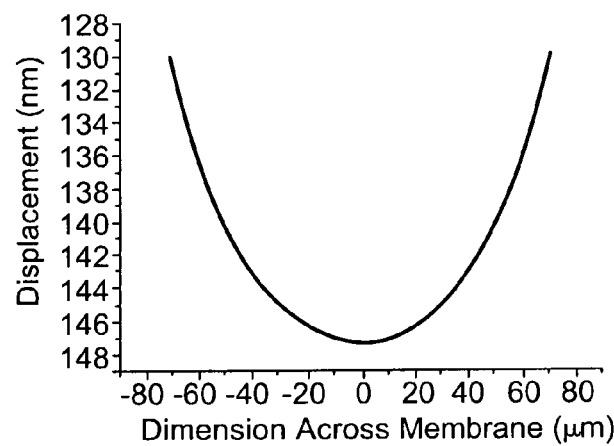
Figure 11C:
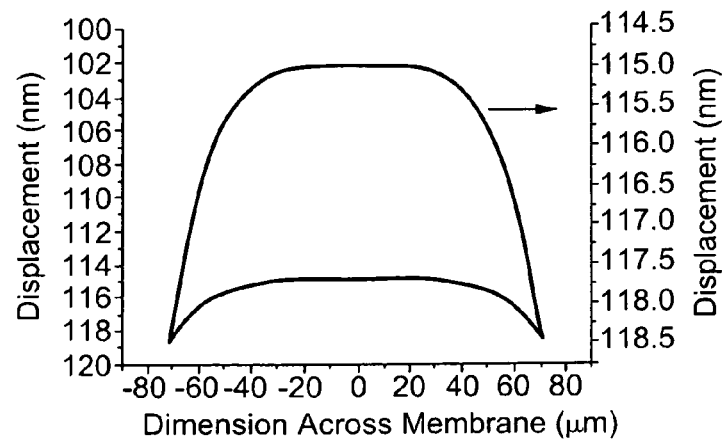

Graphs of membrane displacement relative to the transverse dimension across the membrane along the dotted line shown in the respective FIGS. 10A, 10B and 10C, are provided respectively in FIGS. 11A, 11B and 11C.

The dimensions of the unstressed membranes are such that the central membrane area is 100 µm×100 µm, while the support arms are 20 µm wide by 140 µm long. A bias of 0.5V is taken to be applied across each central membrane area.

It is clearly evident that the optimum membrane geometry having the flattest central area is the swirl suspension configuration shown in FIGS. 10E and 10F. This geometry has =0.5 nm variation across the central 50 µm×50 µm portion of the membrane making it an ideal candidate for an FP optical filter.

Figure 12:
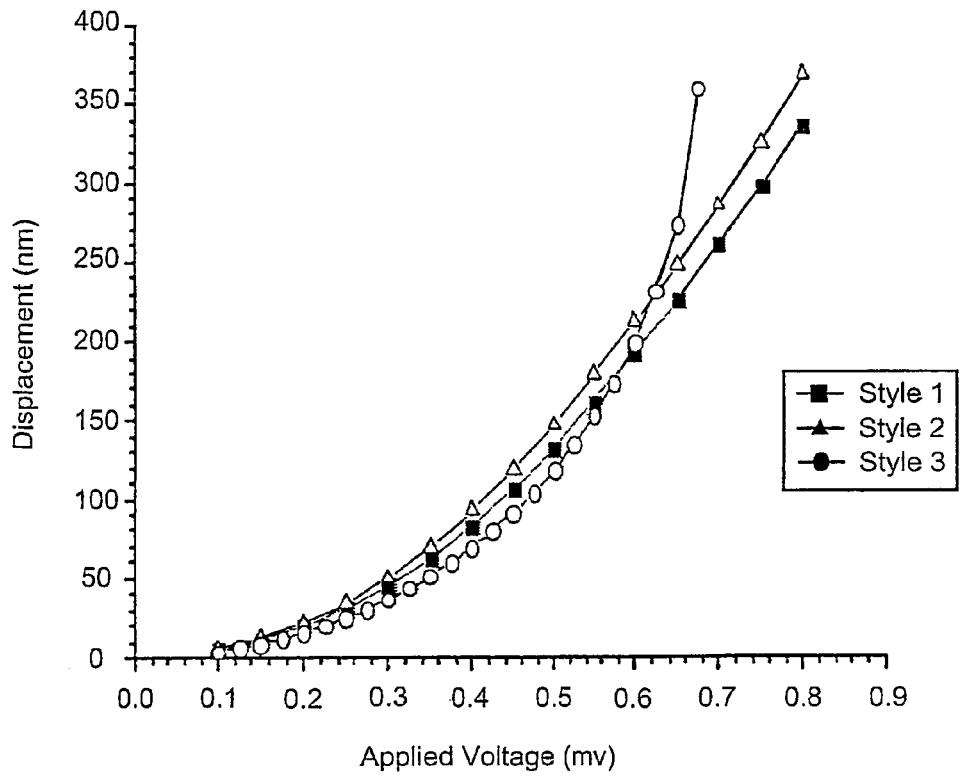
FIG. 12 is a graph of the power law relationship of the membrane displacement to applied voltage in respect of the different membrane styles shown in FIGS. 10A to 10C.

The power law relationship of the membrane displacement to applied voltage is shown at FIG. 12 for each of the membrane configurations shown in FIG. 10.

In this graph, style 1 corresponds to the membrane configuration of FIG. 10A, style 2 corresponds to the membrane configuration of FIG. 10B, and style 3 corresponds to the membrane configuration of FIG. 10C.

As can be seen from this graph, styles 1 and 2 generally have a more linear response which is advantageous to control the membrane displacement and hence the resonant wavelength point of the FP filter. The displacement of style 3 follows closely the response of style 1 and 2 until approximately 0.6V, where the displacement becomes highly nonlinear. This has the disadvantage that cavity length control for this style of membrane will become unstable above this voltage, leading to a smaller operational range compared to the other styles.

The aforementioned disadvantage, however, can be overcome by increasing the support length of the membrane.

Figure 13:
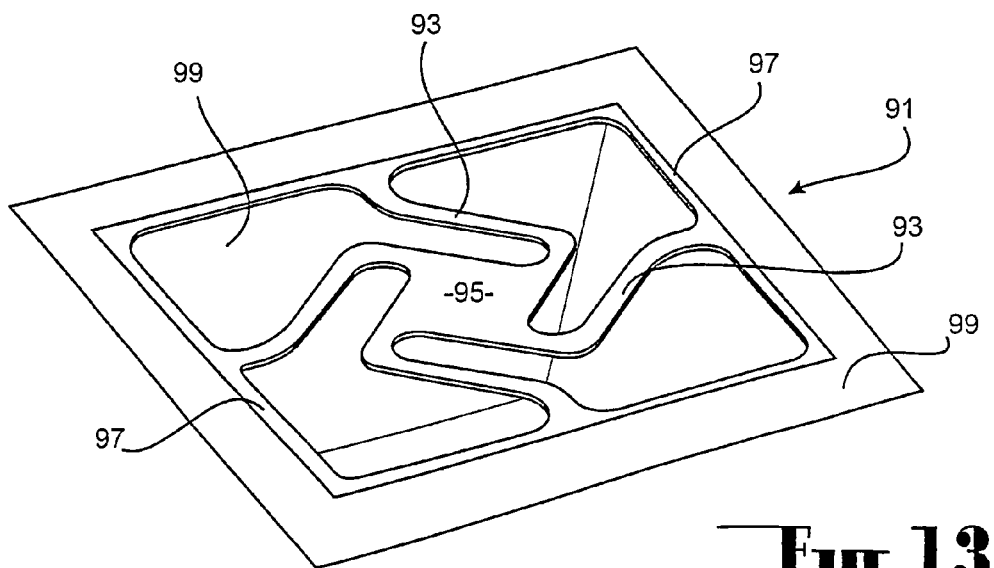
FIG. 13 is a perspective three dimensional view of the swirl style of reflector/membrane of FIG. 10C mounted to the polyimide supports.

Accordingly, a fifth embodiment of the present invention is provided where the tunable cavity resonator is fabricated according to any of the preceding embodiments, but where the configuration for geometric patterning of the membrane is as shown in FIG. 13 of the drawings. As can be seen in this drawing, the membrane 91 is of a swirl suspension configuration having arms 93 extended from the central rectangular portion 95 of the membrane and integrally formed with a rectangular peripheral portion 97, which is mounted upon the circumscribing polyimide structure 99. In this arrangement, the arms 93 are marginally extended from the configuration shown in FIG. 10C in order to provide for greater deflective movement in response to the resultant electrostatic force arising from the applied bias to the electrodes of the device.

The fabrication technique for a tunable cavity resonator can be further simplified by defining the support locations after forming the sacrificial layer and prior to depositing the various membrane and reflector layers.

Thus a sixth embodiment of the present invention is provided for fabricating a tunable cavity resonator as shown in FIGS. 14A to 14H of the drawings.

As is shown in FIG. 14A, a sacrificial layer 101 of polyimide is thermally evaporated upon a substrate 103 formed with a first reflector layer (not shown) to a thickness of approximately 2 microns. Then, as shown in FIG. 14B, recesses for the support locations 105 are formed within the sacrificial layer 101, down to the substrate 103. A membrane layer 107 of $SiN_x$ is then deposited upon the exposed surface of the sacrificial layer and the substrate, as revealed within the support locations 105, as shown in FIGS. 14C and 14D. The reflector layers 109 are then deposited upon the membrane layer 107, as shown in FIG. 14E.

The reflector layer 109 and membrane 107 is then patterned as required to form one side of the cavity, as shown in FIGS. 14F and 14G.

Finally the sacrificial layer 101 is etched in a similar manner to that described in the preceding embodiments, to provide the final form of the structure as shown in FIG. 14H.

This particular technique is a refinement of the previously described techniques, whereby the support structure is formed intrinsically by the membrane and reflector layers, instead of being separately formed as a discrete step as a masked portion of the sacrificial layer. This is more efficient and thus cost effective to utilize in mass production and thus is an enhancement of the aforementioned techniques.

Integrating MEMS technology with IR sensor technology in the fabrication of resonant cavities in accordance with the present invention has an important benefit in being able to reduce the volume of the devices fabricated with the methods described herein. This in turn provides a higher operating temperature (HOT) for such devices. In the case of detector applications, the combination of HOT detectors with wavelength agile systems opens up a wide range of high-speed chemical and biological sensor applications. In addition, such integration provides for the construction of tunable multi-spectral infrared focal plane arrays (IRFPA's).

It should be appreciated that the scope of the present invention is not limited to the specific embodiments herein described. In particular, the use of the invention is not limited to PECVD and has utility with other types of deposition techniques. In addition, the invention is not limited to the specific types of detector devices described herein. In this respect, there are several different types of detector devices in existence and future arrangements still to be developed. Accordingly, it is understood that appropriate modifications and variations to the methods described herein that are necessary to adapt the invention to other detector types, but which are obvious or common knowledge to a skilled person in the art of semiconductor fabrication, are considered to be part of the invention and fall within the scope thereof.

We claim:

1. A method for fabricating a tunable cavity resonator having a pair of reflectors, one being disposed in fixed relationship to a substrate material and the other being a suspended moveable membrane disposed a cavity length from the one reflector, and a pair of electrodes either being constituted by the reflectors or being juxtaposed therewith, one electrode with the one reflector and the other electrode with the other reflector, the method comprising:
    depositing a first reflector layer on a substrate to form the one reflector of the cavity resonator;
    forming a sacrificial layer on the first reflector layer;
    forming the membrane on the sacrificial layer;
    depositing a second reflector layer on the membrane to form the other reflector;
    patterning the second reflector layer in accordance with a prescribed membrane geometry;
    etching the second reflector layer and the membrane to achieve said prescribed membrane geometry; and
    etching the sacrificial layer to release the membrane and suspend it in substantially parallel relation to the first reflector layer,
    wherein the method further comprises protecting regions of the sacrificial layer constituting a support structure for suspending the membrane with photoresist.

2. The method as claimed in claim 1, including finally etching regions of the sacrificial layer which are unprotected to release the membrane and suspend it by the support structure in substantially parallel relation to the first reflector layer.

3. The method as claimed in claim 1, including forming the substrate material as a semiconductor system that provides access to optical wavelengths necessary for resonance purposes in the resonant cavity.

4. The method as claimed in claim 3, including forming the sacrificial layer of a thickness such that the resultant cavity length so formed allows filtering of radiation having optical wavelengths in the infrared region.

5. The method as claimed in claim 1, including forming the suspended moveable membrane with sufficient resiliency so that it may be displaced to an extent that is commensurate to the full cavity length, but such displacement is controllable to be marginally less than the full cavity length to avoid the membrane contacting the one reflector.

6. The method as claimed in claim 1, including forming the membrane of silicon nitride.

7. The method as claimed in claim 1, including forming the sacrificial layer of zinc sulphide.

8. The method as claimed in claim 1, including forming the substrate from an infrared sensitive material.

9. The method as claimed in claim 8, including forming the substrate of mercury cadmium telluride (MCT).

10. The method as claimed in claim 1, including, forming the membrane using PECVD.

11. The method as claimed in claim 1, including forming the electrodes separately of the reflective layers.

12. The method as claimed in claim 1, including forming the reflective layers to function as electrodes.

13. The method as claimed in claim 1, including etching the second reflector layer using an anisotropic etching process.

14. The method as claimed in claim 13, including dry etching the second reflector layer.

15. The method as claimed in claim 14, including plasma etching the second reflector layer.

16. The method as claimed in claim 15, including reactive ion etching the second reflector layer.

17. The method as claimed in claim 1, including initially etching the sacrificial layer using an isotropic etching process.

18. The method as claimed in claim 17, including initially dry etching the sacrificial layer.

19. The method as claimed in claim 1, including finally etching regions of the sacrificial layer which are unprotected by the photoresist using an isotropic etching process.

20. The method as claimed in claim 19, including wet etching the regions of the sacrificial layer which are unprotected.

21. A tunable cavity resonator fabricated according to the method as claimed in claim 1.

22. The method as claimed in claim 1, wherein the deposition technique comprises introducing intrinsic stress in the membrane during its formation.

23. The method as claimed in claim 22, wherein the intrinsic stress introduced in the membrane is adapted to be compensated by a compressive stress applied thereto during the fabrication of the tunable cavity resonator such that the resultant stress in the membrane is substantially zero or sufficiently low upon release from the sacrificial layer.

24. The method as claimed in claim 23, wherein the membrane is substantially flat when suspended and not deformed due to electrostatic forces.

25. The method as claimed in claim 23, wherein the membrane is substantially flat when suspended and not deformed due to electrostatic forces.

26. A method for fabricating a tunable cavity resonator for filtering incident radiation with longer photonic wavelengths from applications where the wavelengths may be in the order of less than 1 micron to applications where the wavelengths may be greater than 20 microns, the cavity resonator having a pair of reflectors, one being disposed in fixed relationship to a substrate material and the other being disposed on a moveable membrane suspended by a support structure and disposed a cavity length from the one reflector, to form a Fabry Perot (FP) cavity, and a pair of electrodes either being constituted by the reflectors or being juxtaposed therewith, one electrode with the one reflector and the other electrode with the other reflector, to control the movement of the membrane in response to a prescribed dc voltage applied across electrodes, the method comprising:
forming the membrane on a sacrificial layer using a plasma deposition technique at a sufficiently low temperature with a gas flow ratio and prescribed RF frequency and power to excite the plasma so that the resultant stress in the membrane when released from the sacrificial layer and suspended by the support structure is substantially zero or sufficiently low, and the pinhole density in the membrane is sufficiently low to provide the membrane with the requisite integrity and morphology to exhibit a near-ideal Fabry Perot response
wherein the method further comprises protecting regions of the sacrificial layer constituting the support structure with photoresist.

27. The method as claimed in claim 26, including fabricating the cavity resonator to function as a filter applicable for detecting incident radiation of wavelengths in ranges, whereby the wavelength of resonance can be in the region of 100 nm to 1,000,000 nm.

28. The method as claimed in claim 26, including forming the membrane of silicon nitride.

29. The method as claimed in claim 26, including forming the sacrificial layer of zinc sulphide.

30. The method as claimed in claim 26, including forming the substrate from an infrared sensitive material.

31. The method as claimed in claim 30, including forming the substrate of mercury cadmium telluride (MCT).

32. The method as claimed in claim 26, including forming the membrane using PECVD.

33. The method as claimed in claim 26, including matching the temperature of the plasma deposition to the tolerance of the materials constituting the sacrificial layer and the substrate.

34. The method as claimed in claim 26, including selecting the gas flow ratio at the desired deposition temperature to achieve the requisite intrinsic stress at a prescribed RF frequency and power that still provides the membrane with the requisite integrity and morphology to maintain a high yield process.

35. The method as claimed in claim 34, including setting the gas flow ratio to comprise an appropriate ratio of silane to ammonia to a diluting gas so as to achieve the required level of intrinsic stress that can result in virtually zero stress in the released membrane.

36. The method as claimed in claim 26, including forming the electrodes separately of the reflective layers.

37. The method as claimed in claim 26, including forming the reflective layers to function as electrodes.

38. The method as claimed in claim 26, including etching the second reflector layer using an anisotropic etching process.

39. The method as claimed in claim 38, including dry etching the second reflector layer.

40. The method as claimed in claim 39, including plasma etching the second reflector layer.

41. The method as claimed in claim 40, including reactive ion etching the second reflector layer.

42. The method as claimed in claim 26, including etching the sacrificial layer to release the membrane and suspend it by the support structure in substantially parallel relationship to the first reflector layer.

43. The method as claimed in claim 26, including initially etching the sacrificial layer using an isotropic etching process.

44. The method as claimed in claim 43, including initially dry etching the sacrificial layer to form the support structure.

45. The method as claimed in claim 26, including finally etching regions of the sacrificial layer which are unprotected by the photoresist using an isotropic etching process to release the membrane and suspend it by the support structure.

46. The method as claimed in claim 45, including wet etching the regions of the sacrificial layer which are unprotected.

47. The method as claimed in claim 26, wherein the plasma deposition technique comprises introducing intrinsic stress in the membrane during its formation.

48. The method as claimed in claim 47, wherein the intrinsic stress introduced in the membrane is adapted to be compensated by a compressive stress applied thereto during the fabrication of the tunable cavity resonator such that the resultant stress in the membrane is substantially zero or sufficiently low upon release from the sacrificial layer.

* * * * *